(12) United States Patent
Galstian et al.

(10) Patent No.: US 11,035,552 B2
(45) Date of Patent: Jun. 15, 2021

(54) LIQUID CRYSTAL DYNAMIC BEAM CONTROL DEVICE AND MANUFACTURE

(71) Applicant: LensVector Inc., San Jose, CA (US)

(72) Inventors: Tigran Galstian, Quebec (CA); Karen Asatryan, Quebec (CA); Vladimir Presniakov, Quebec (CA); Armen Zohrabyan, Quebec (CA); Jacques Godin, Quebec (CA)

(73) Assignee: LensVector Inc., San Jose, CA (US)

( * ) Notice: Subject to any disclaimer, the term of this patent is extended or adjusted under 35 U.S.C. 154(b) by 0 days.

(21) Appl. No.: 16/331,231

(22) PCT Filed: Sep. 8, 2017

(86) PCT No.: PCT/CA2017/051059
§ 371 (c)(1),
(2) Date: Mar. 7, 2019

(87) PCT Pub. No.: WO2018/045469
PCT Pub. Date: Mar. 15, 2018

(65) Prior Publication Data

US 2019/0186712 A1 Jun. 20, 2019

Related U.S. Application Data

(60) Provisional application No. 62/423,810, filed on Nov. 18, 2016, provisional application No. 62/384,747, filed on Sep. 8, 2016.

(51) Int. Cl.
*F21V 14/00* (2018.01)
*G02F 1/1334* (2006.01)
(Continued)

(52) U.S. Cl.
CPC ............. *F21V 14/003* (2013.01); *G02B 5/02* (2013.01); *G02F 1/137* (2013.01); *G02F 1/1334* (2013.01);
(Continued)

(58) Field of Classification Search
CPC ......... F21V 14/003; G02F 2001/13324; G02F 1/13324; G02F 1/29; G02F 1/13318;
(Continued)

(56) References Cited

U.S. PATENT DOCUMENTS 5,177,628 A   1/1993  Moddel
6,045,643 A *  4/2000  Byker ................. G02F 1/13318
                                              156/102

(Continued)

FOREIGN PATENT DOCUMENTS

WO   2015121429 A1   8/2015
WO   2016026055 A1   2/2016

OTHER PUBLICATIONS

Ferrari et al., "Effect of size polydispersity in polymer-dispersed liquid-crystal films"; Journal of Applied Physics, vol. 103, 084505, p. 1-4, 2008.

(Continued)

*Primary Examiner* — Jessica M Merlin
(74) *Attorney, Agent, or Firm* — J-Tek Law PLLC; Jeffrey D. Tekanic; Scott T. Wakeman

(57) ABSTRACT

A variable light beam is provided from a light source. The light source can be an LED light source or other source. The light source includes basic collimation optics, such as reflector or Fresnel lens, an electrically controllable LC device, such as a polydisperse LC film, in front of the incident spot light beam. Preferably the polydisperse LC film includes transparent flat uniform electrode layers. The LC device can be autonomous of the light source. The proposed solution (Continued)

circuit board with PV provides a dynamically controllable, preferably polarizer-free and pixel-free, beam shape light source module including a controllable light beam control module and a light source module providing the initial light beam in a scanner light source, a camera flash, an architectural, automobile or industrial lighting device.

19 Claims, 25 Drawing Sheets

(51) Int. Cl.

| | | |
|---|---|---|
| *G02B 5/02* | (2006.01) | |
| *G02F 1/29* | (2006.01) | |
| *G02F 1/13357* | (2006.01) | |
| *G02F 1/1347* | (2006.01) | |
| *G02F 1/133* | (2006.01) | |
| *G02F 1/1333* | (2006.01) | |
| *G02F 1/1343* | (2006.01) | |
| *G02F 1/137* | (2006.01) | |
| *G08C 23/04* | (2006.01) | |

(52) U.S. Cl.
CPC ........ *G02F 1/1347* (2013.01); *G02F 1/13318* (2013.01); *G02F 1/13439* (2013.01); *G02F 1/13476* (2013.01); *G02F 1/133308* (2013.01); *G02F 1/133608* (2013.01); *G02F 1/29* (2013.01); *G02F 1/13324* (2021.01); *G02F 1/13775* (2021.01); *G02F 2201/56* (2013.01); *G02F 2203/12* (2013.01); *G02F 2203/24* (2013.01); *G08C 23/04* (2013.01)

(58) Field of Classification Search
CPC ........... G02F 1/133308; G02F 1/13439; G02F 1/137; G02F 1/1334; G02F 1/13775; G02F 2203/24; G02F 2201/56; G02F 2203/12; G02F 1/133608; G02F 1/134706; G02F 1/1347; G02B 5/02; G08C 23/04
See application file for complete search history.

(56) References Cited

U.S. PATENT DOCUMENTS

| | | |
|---|---|---|
| 6,897,936 B1 | 5/2005 | Li et al. |
| 2008/0198280 A1 | 8/2008 | Hikmet et al. |
| 2010/0148688 A1 | 6/2010 | Hikmet et al. |
| 2011/0280018 A1* | 11/2011 | Vissenberg ........ G02B 19/0009 362/277 |
| 2016/0252235 A1* | 9/2016 | Benner ................ F21V 14/003 362/257 |
| 2016/0258599 A1* | 9/2016 | Genthon ............... F21V 14/003 |
| 2017/0218686 A1 | 8/2017 | Galstian |

OTHER PUBLICATIONS

International Preliminary Report on Patentability dated Mar. 12, 2019 for parent application No. PCT/CA2017/051059.
International Search Report dated Mar. 15, 2018 for parent application No. PCT/CA2017/051059.

* cited by examiner

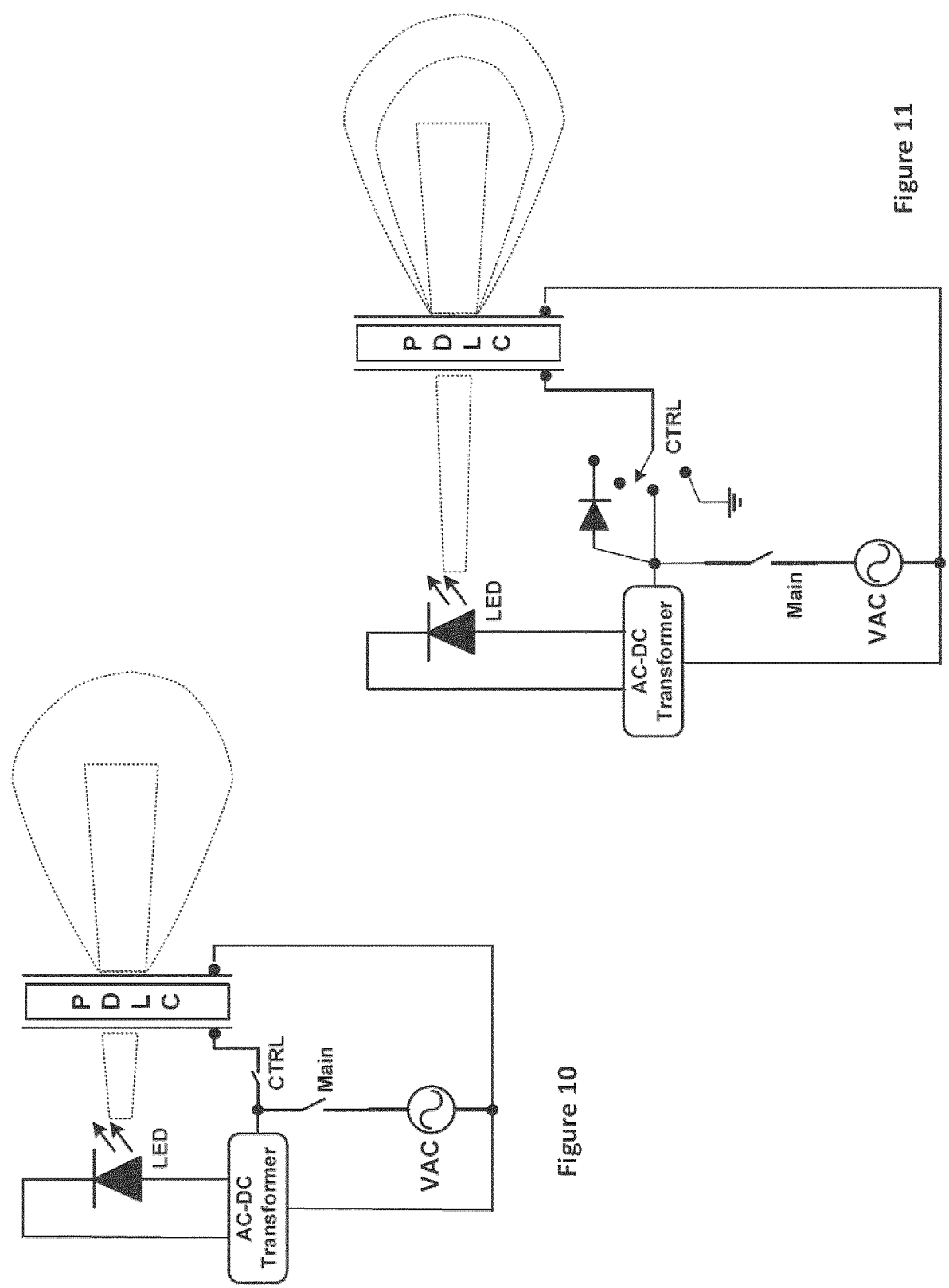

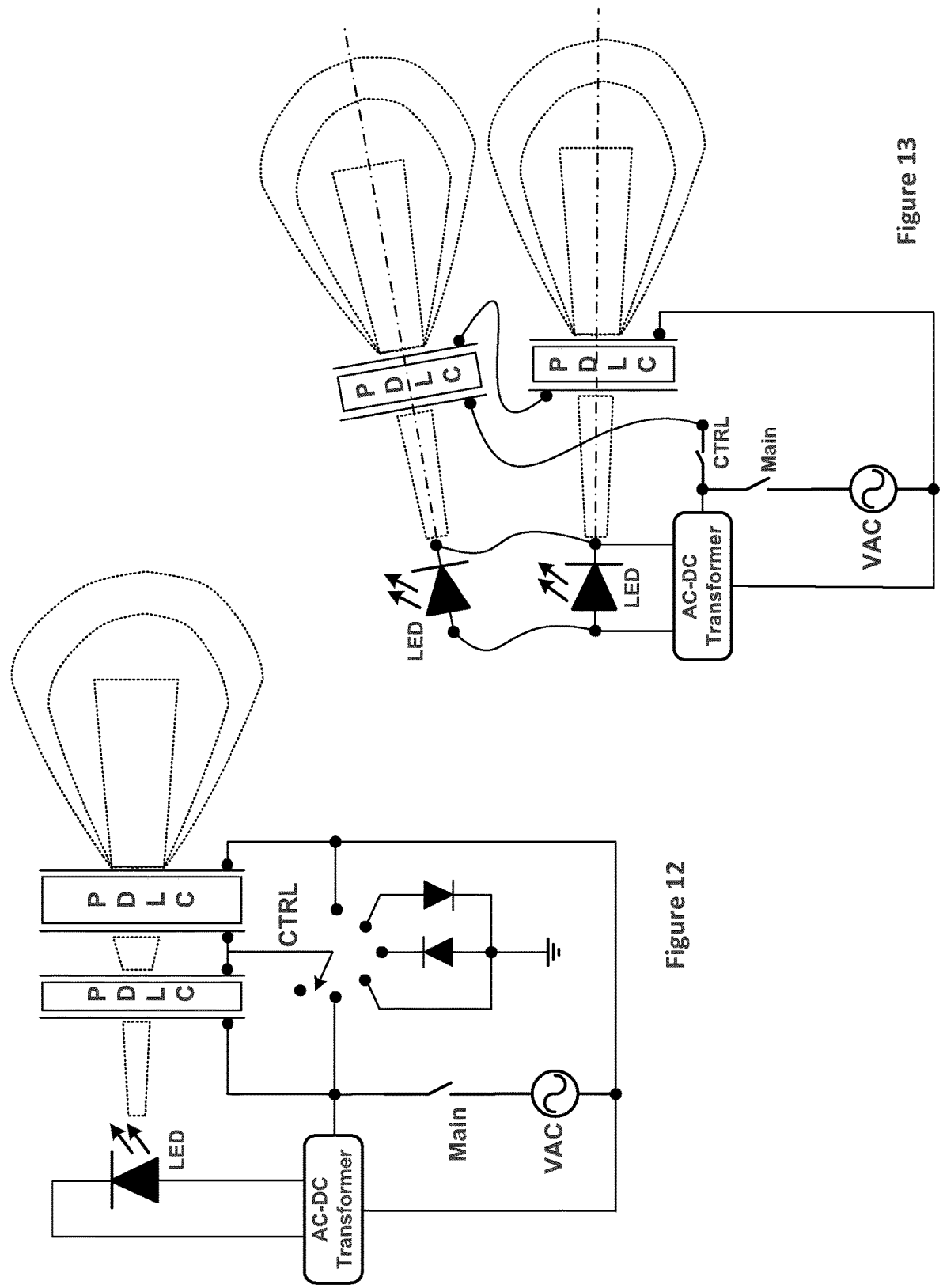

LIQUID CRYSTAL DYNAMIC BEAM CONTROL DEVICE AND MANUFACTURE

This application claims priority of U.S. provisional patent applications 62/384,747 filed Sep. 8, 2016 and 62/423,810 filed Nov. 18, 2016, the contents of which are hereby incorporated by reference.

TECHNICAL FIELD

This patent application relates to liquid crystal beam dispersion control devices, their manufacturing and their integration into luminaires or light sources.

BACKGROUND

A visible light source can be light emitting diode, an incandescent light bulb, fluorescent light source, or electroluminescent source. For utility lighting of spaces, also called architectural lighting, it is known to use reflectors and/or lenses to provide a light source beam having a desired collimation or divergence. However Light Emitting Diode (LEDs) are currently being massively deployed in new installations as well as in replacement of previous light sources. Those LED sources already provide significant energy savings and carry the promise of enabling emerging applications such as the dynamic control of light intensity and color as well as supporting LiFi (instead of or in parallel with WiFi) communications.

Dynamic control of the spatial shape of light, its divergence, glare and direction is not provided in such light sources. This is presently done by combining many (hundreds) of LED sources that are pointing in different directions and by controlling them one by one by using a rather complex electronics.

Efforts known to date propose complex mechanical systems with step motors and mirrors to obtain the spatial control of light.

Liquid Crystal (LC) materials have been successfully used for LC displays (LCD) and electrically variable imaging lenses (see WO2009/153764). In those LC devices, an electric field is typically used to control the molecular orientation of LC material in a LC cell. The change in molecular orientation affects the local index of refraction of the LC material and hence its refractive index distribution. This can change the phase of light or its polarization.

However, to control light divergence, a non-uniform (dynamically controllable) refractive index distribution is needed. Particularly in LC lensing control applications, particular refractive index gradient variations can create what is known as gradient index (GRIN) lensing. In another case of LCD devices, multiple electrodes are deployed to achieve this modulation.

In addition, to operate with unpolarised light, the LCD devices used for display applications traditionally use two polarizers which reduce significantly the light efficiency (in terms of light transmission of back towards the viewer) down below 10%. The deleterious reduction in light efficiency due to the use of polarizers is the reason for which the applicant developed double LC layer structures (each layer having its ground state optical axes perpendicular to the other layer) for mobile imaging applications (mobile cell phone camera) to provide electrically variable imaging lenses without polarizers.

The above mentioned LC imaging lenses were often limited to 3 mm clear aperture and it was possible to use non-segmented (pixel-free) electrodes to perform the focusing. However, LED based illumination systems are typically using blue LED pumped phosphor layers where the light source is Lambertian (very diverging at each point of light source). To collimate this source various types of reflectors are used. This provides an output beam that may be more or less collimated (e.g., 10 degrees, measured as full width at half maximum of light intensity transversal distribution, or FWHM). In addition, the clear aperture of luminaires (employing such light sources) may typically be as large as 100 mm.

Existing LED based lighting systems have fixed beam dispersion (either fixed broad dispersion or fixed spot beam). For example, FIG. 1 illustrates the spot light beam cast by a commercially available LED light source from CREE on a white screen. A "single aperture" approach cannot provide enough modulation (optical path difference between different optical rays) to generate a significant change in the divergence of light. Thus, the projected light beam size (spot or flood) will remain almost the same on a given scene. This has created the necessity of introducing multiple aperture (pixelized) elements such as arrays of linear or circular micro lenses configured to add dispersion to spot light beams. Such novel developments are described in international application PCT/CA2016/050589 filed May 25, 2016 the entirety of which is incorporated herein by reference. Liquid crystal beam shaping devices are also known in the patent literature, as for example, US2010/0149444, published Jun. 17, 2010. Such devices are placed in the optical path of the beam at some distance from the light emitting portion of the light source. Such devices typically require electrical power supply of about 50 V and require control over their operation.

FIG. 1 illustrates the spot light beam cast by a commercially available LED light source from CREE on a white screen. FIG. 2 illustrates the spot light beam broadened by using pixelized LC beam shaping device. A cross-like structure can be observed in the intensity distribution. FIG. 3 illustrates the spot light beam broadened by using an improved LC beam shaping device. While the persisting cross-like structure is reduced and the beam looks more circularly symmetric.

The use of multi-aperture elements requires an additional step of etching of electrodes thus increasing the cost of manufacture thereof. There is a need to improve the cost of manufacture of dynamically variable beam shaping LC devices while preserving the beam quality of light sources.

In some applications, the use of multi-aperture elements can be suitable, however, as with pixel-free LC beam broadening devices, their integration into a light source remains a challenge.

SUMMARY

A variable light beam is provided from a light source. The light source can be an LED light source or other source. The light source includes basic collimation optics, such as reflector or Fresnel lens, an electrically controllable LC device, such as a polydisperse LC film, in front of the incident spot light beam. Preferably the polydisperse LC film includes transparent flat uniform electrode layers. The LC device can be autonomous of the light source. The proposed solution provides a dynamically controllable, preferably polarizer-free and pixel-free, beam shape light source module including a controllable light beam control module and a light source module providing the initial light beam in a scanner light source, a camera flash, an architectural, automobile or industrial lighting device.

The current application discloses, in some embodiments, LC devices where the LC clusters or droplets have a polydisperse character and their properties (effective refractive index) can be dynamically controlled by applying an electric field, for example a uniform electric field using preferably planar transparent electrodes. This allows the elimination of pixellization of electrodes (so a single-aperture device is considered here) as well as elimination of polarizers. In some embodiments even a single layer polydisperse composite material (LC-polymer, LC-particles, etc.) can be used to control the light broadening angle. In some other embodiments, two or more layers of such composite materials is described reducing significantly the cost of the device.

Applicant has discovered a number of characteristics related to the optical performance of polydisperse beam shaping LC devices that are free of polarizers and have a single-aperture using non-pixelated, essentially uniform electrodes.

In accordance with the proposed solution, using at least one Polymer Dispersed Liquid Crystal (PDLC) element with polydisperse LC droplets in the light path allows the control of transmitted light beam characteristics. Thus, in accordance with one embodiment of the proposed solution, an actively controlled PDLC film is employed directly and exclusively in front of a low divergence light source to provide variable dispersion control. Preferably the PDLC film includes transparent flat uniform electrode layers.

In accordance with another embodiment of the proposed solution, an actively controlled PDLC film, driven from directly the mains, via a voltage transformer, or via Pulse Width Modulation (PWM) is employed directly and exclusively in front of an LED source to provide variable dispersion control. Additional direct current electric sources or other alternatives may be employed to effect dispersion control.

In accordance with another embodiment of the proposed solution, using at least one Polymer Stabilized Liquid Crystal (PSLC) element with polydisperse LC clusters in the light path allows the control of transmitted light beam characteristics. Thus, in accordance with a broad aspect of the proposed solution, an actively controlled PSLC film is employed directly and exclusively in front of a low divergence light source to provide variable dispersion control. Preferably the PSLC film includes transparent flat uniform electrode layers.

In accordance with another embodiment of the proposed solution, using at least two Polymer Stabilized Liquid Crystal (PSLC) elements with polydisperse LC clusters in the light path allows better control of transmitted light beam characteristics in the case of an unpolarized incident light beam. Thus, in accordance with one embodiment of the proposed solution, actively controlled PSLC films are employed directly and exclusively in front of a low divergence light source to provide variable dispersion control. Preferably those PSLC films include transparent flat uniform electrode layers.

In accordance with another embodiment of the proposed solution, using at least one Micro or Nano Particle Stabilized Liquid Crystal (MNP-SLC) element with polydisperse LC clusters in the light path allows the control of transmitted light beam characteristics. Thus, in accordance with a broad aspect of the proposed solution, an actively controlled MNP-SLC film is employed directly and exclusively in front of a low divergence light source to provide variable dispersion control. Preferably the MNP-SLC film includes transparent flat uniform electrode layers.

In accordance with the proposed solution, a spatially non-uniform, e.g., two dimensional (2D) or three dimensional (3D) organization of the polydisperse composite LC material morphology (such as periodic grating, etc.) can be employed to provide improvements in dynamic light beam angle broadening generally referred to herein as (divergence) dispersion control.

Applicant has also discovered that drive powers in the range of 1 mW to 100's of mW (voltages in the range above 1 V and up to 50 V) can be generated from photovoltaic power taken from a periphery of a spot beam of a light source when a liquid crystal device is mounted at the exit aperture of a light source.

Applicant has further discovered that a liquid crystal beam shaping or steering device can be controlled by detecting a sequence of power modulation supplied to the light source without requiring a separate control signal path for controlling the state of the liquid crystal device.

Applicant has further discovered that integration of a liquid crystal beam control device can be facilitated by a mounting adapted to a given light source exit beam optical aperture so that the liquid crystal beam control device can be connected to the light source after manufacturing the light source.

Applicant has further discovered that a liquid crystal beam control device that provides directional beam control can be mounted to a light source with a rotatable mounting so that different light sources can be used together with a common direction of beam control among the different light sources' liquid crystal beam control devices.

In this application, "beam control device" means an optical device that can receives an input beam to provide a modulated output beam, wherein the modulation can be to variably control diffusion or beam spread in at least one direction or dimension, and/or to steer the beam in at least one direction.

BRIEF DESCRIPTION OF THE DRAWINGS

The proposed solution will be better understood by way of the following detailed description of embodiments of the invention with reference to the appended drawings, in which.

Figure 1:
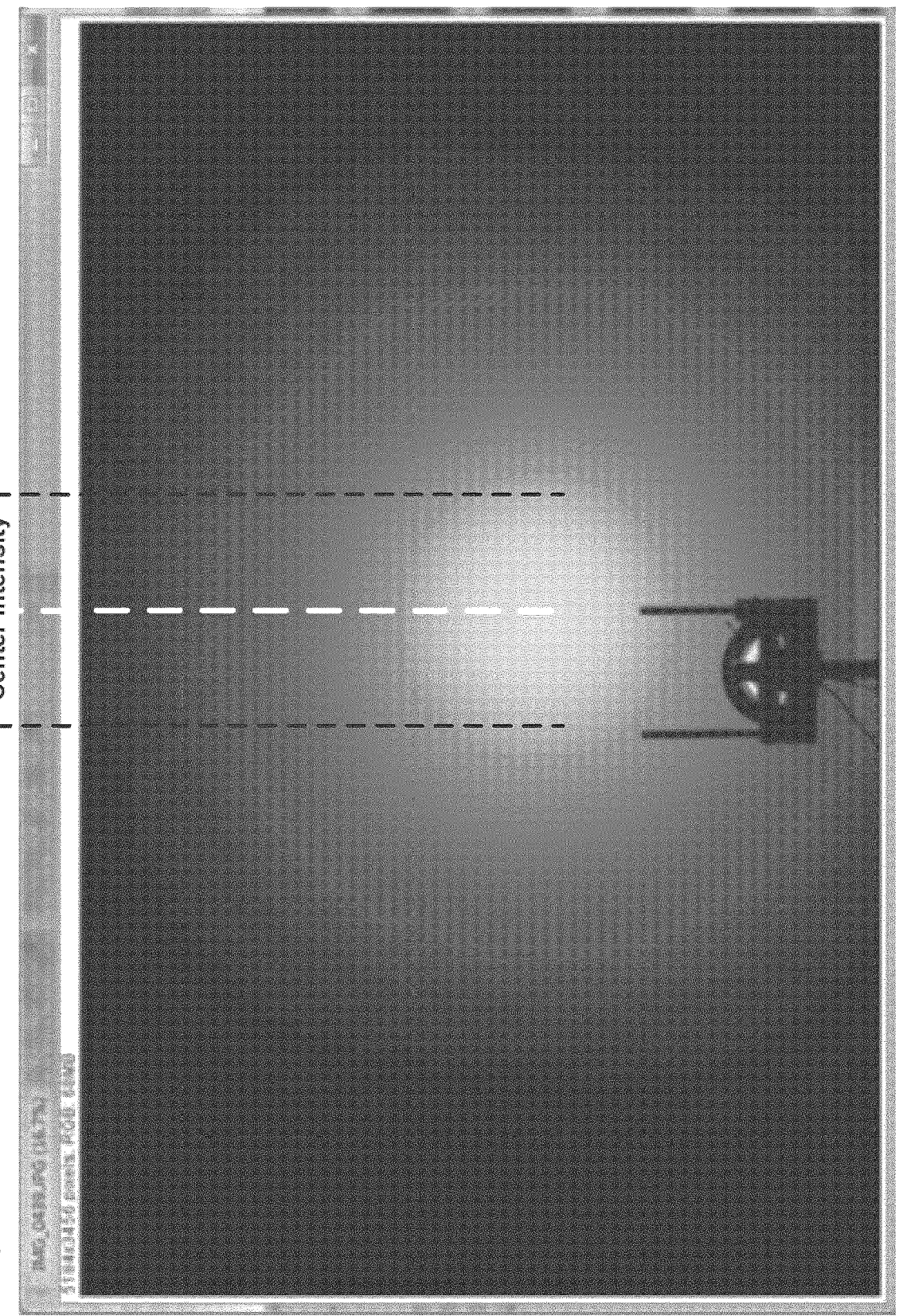
FIG. 1 is an illustration showing a spot beam cast by a commercial LED component available from CREE.
Figure 2:
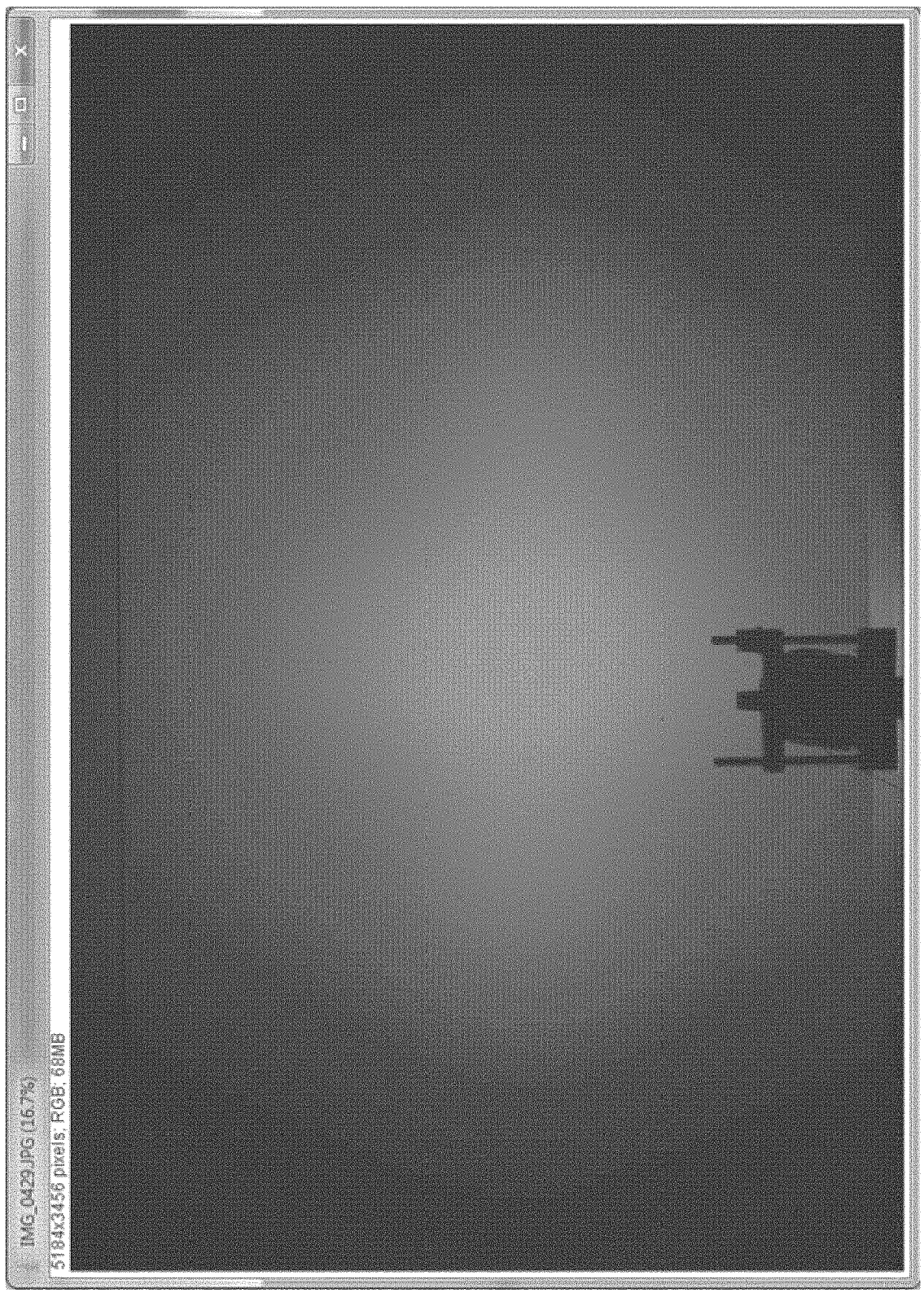
FIG. 2 is an illustration showing an attempt of LED spot beam broadening via an LC beam shaping device which adds dispersion having an undesirable cross-like angular light beam intensity distribution having 4 lobes.
Figure 3:
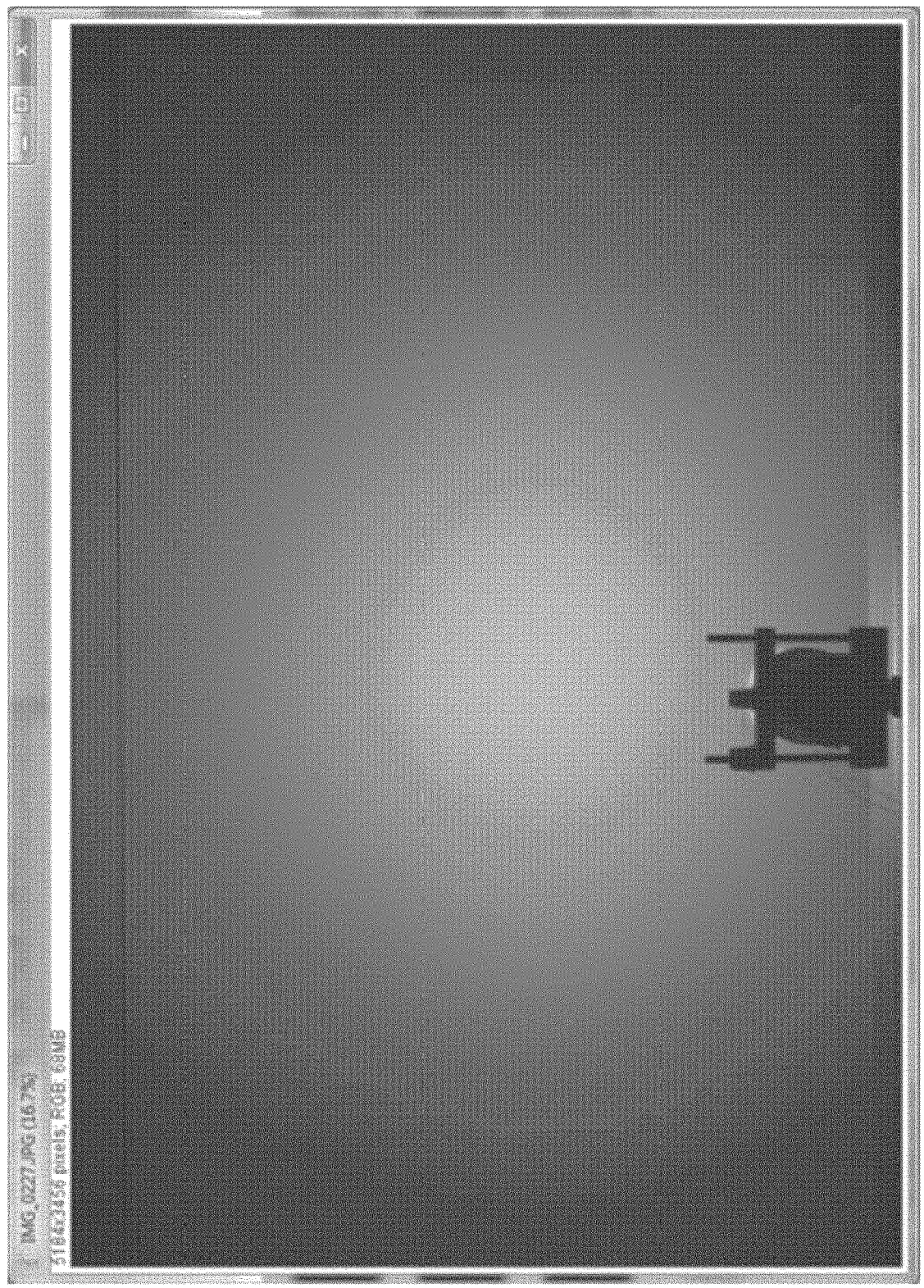
FIG. 3 is an illustration showing another attempt of LED spot beam broadening with the LC beam shaping device of FIG. 2 using a diffusor providing a fixed amount of diffusion providing an improved angular beam intensity distribution however having a persistent cross-like beam envelope.
Figure 5A:
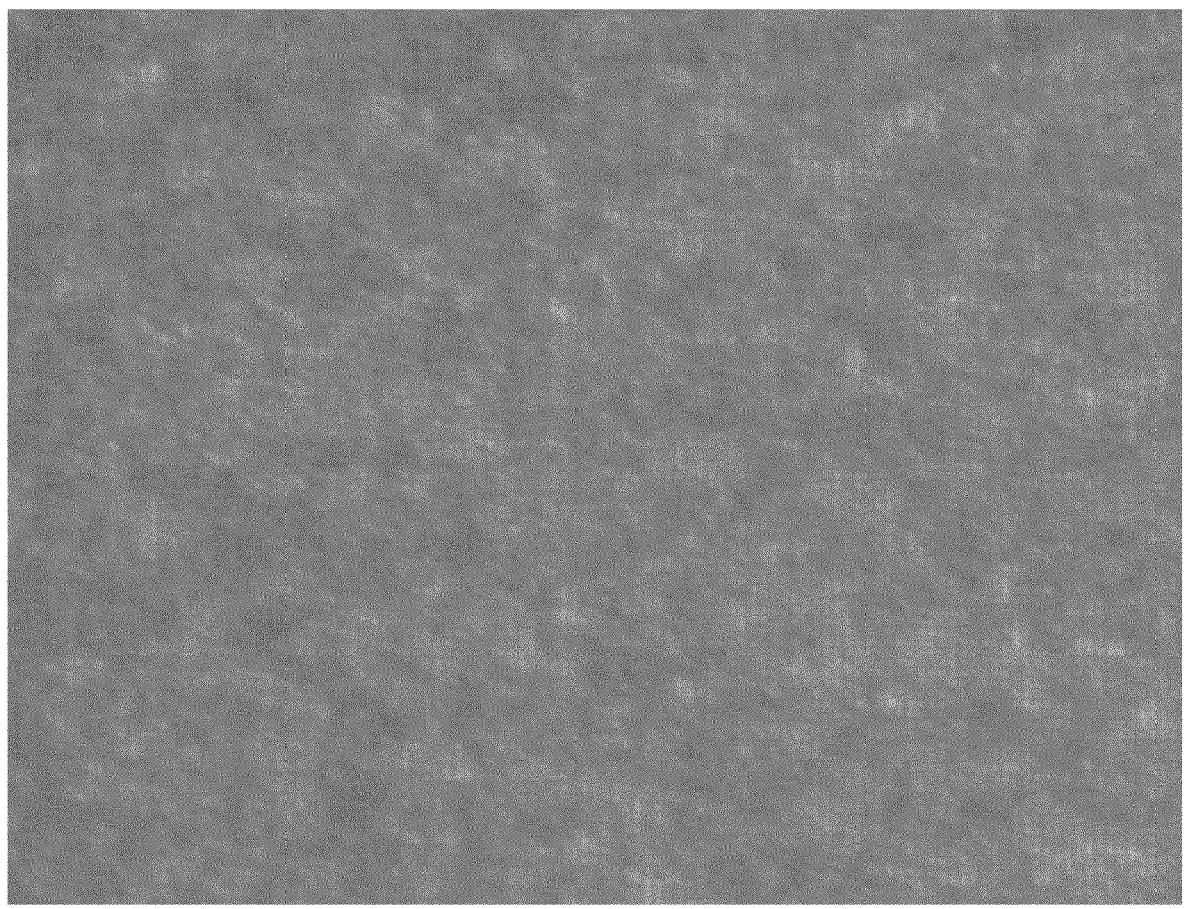
FIG. 5A is an illustration of a PDLC film with good polydispersity.
Figure 5B:
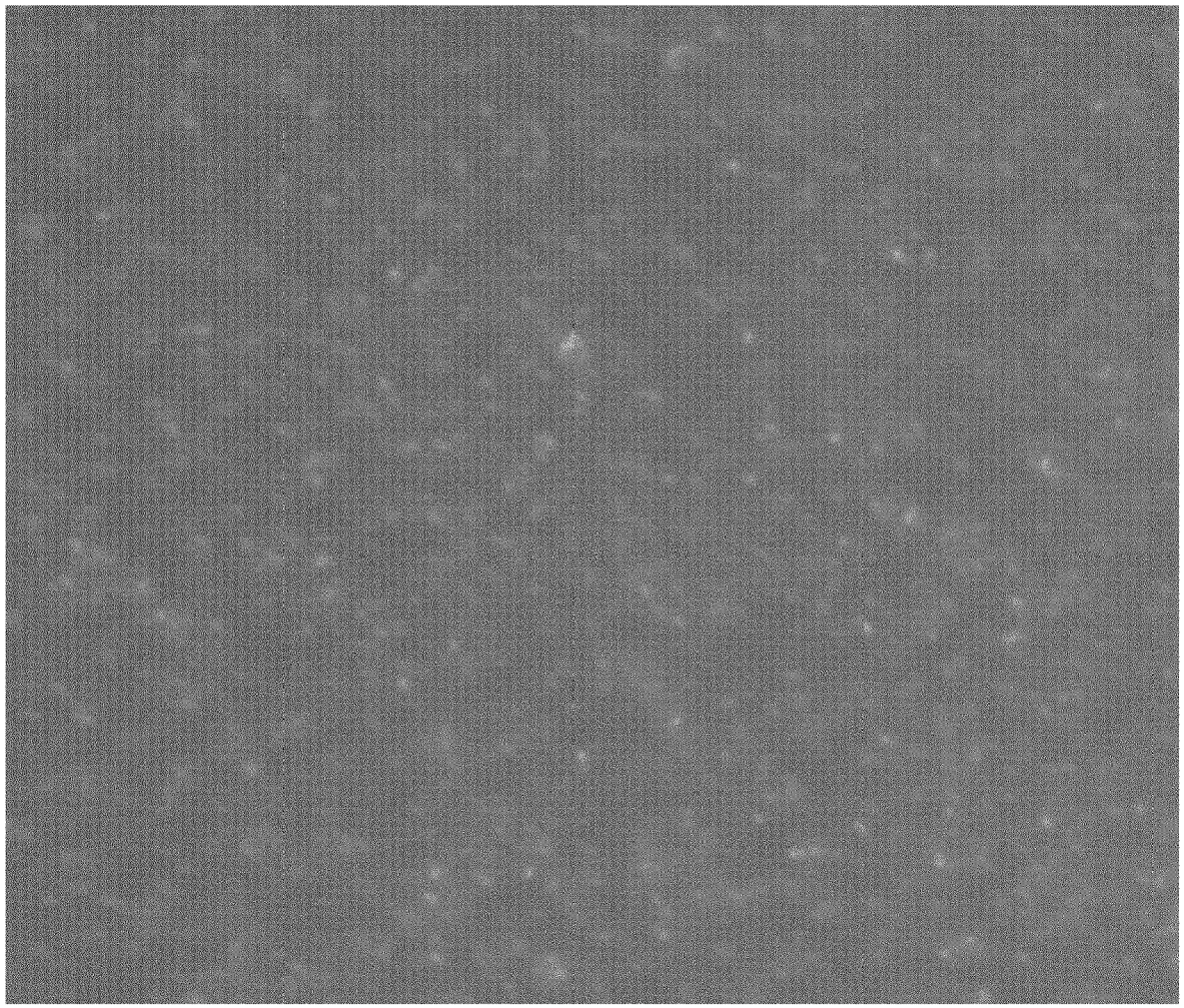
FIG. 5B is an illustration a PDLC film with insufficient polydispersity.
Figure 6A:
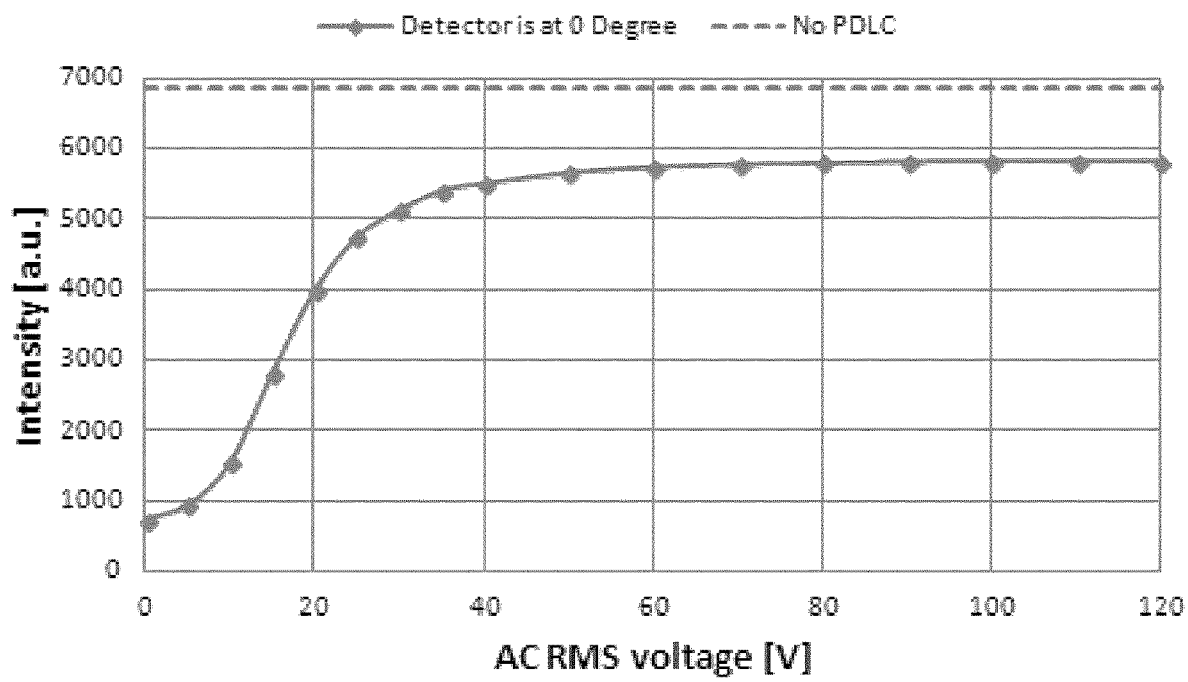
FIG. 6A is a graph showing the measured light transmission versus applied voltage for the device described in FIG.
Figure 6B:
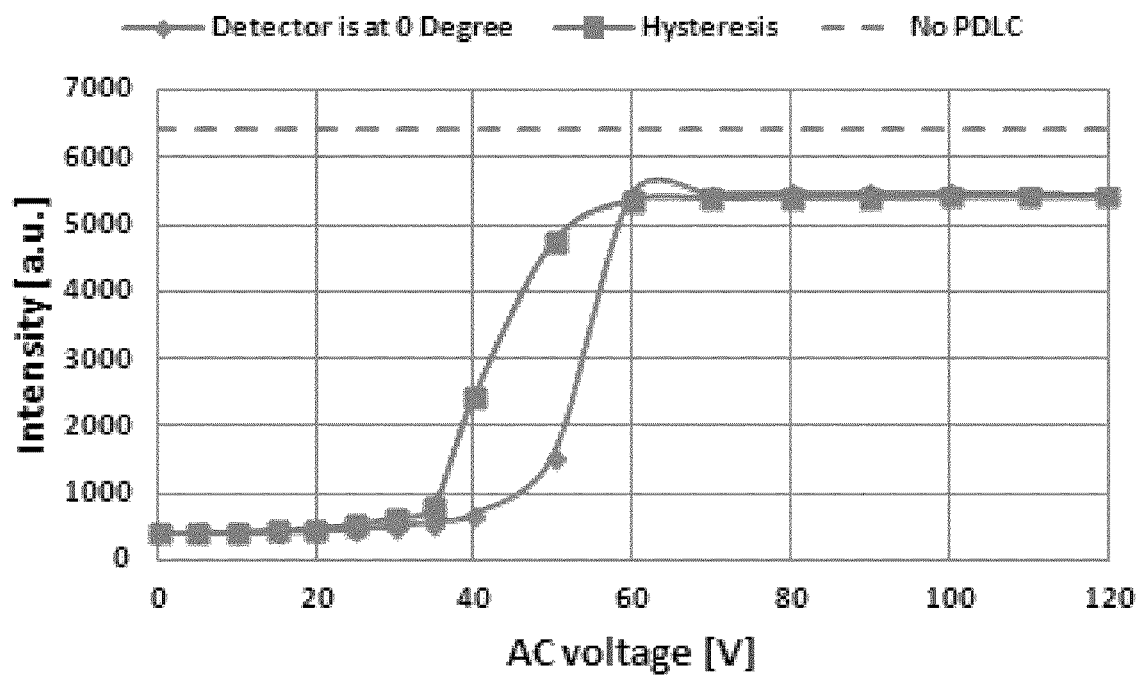
Figure 7:
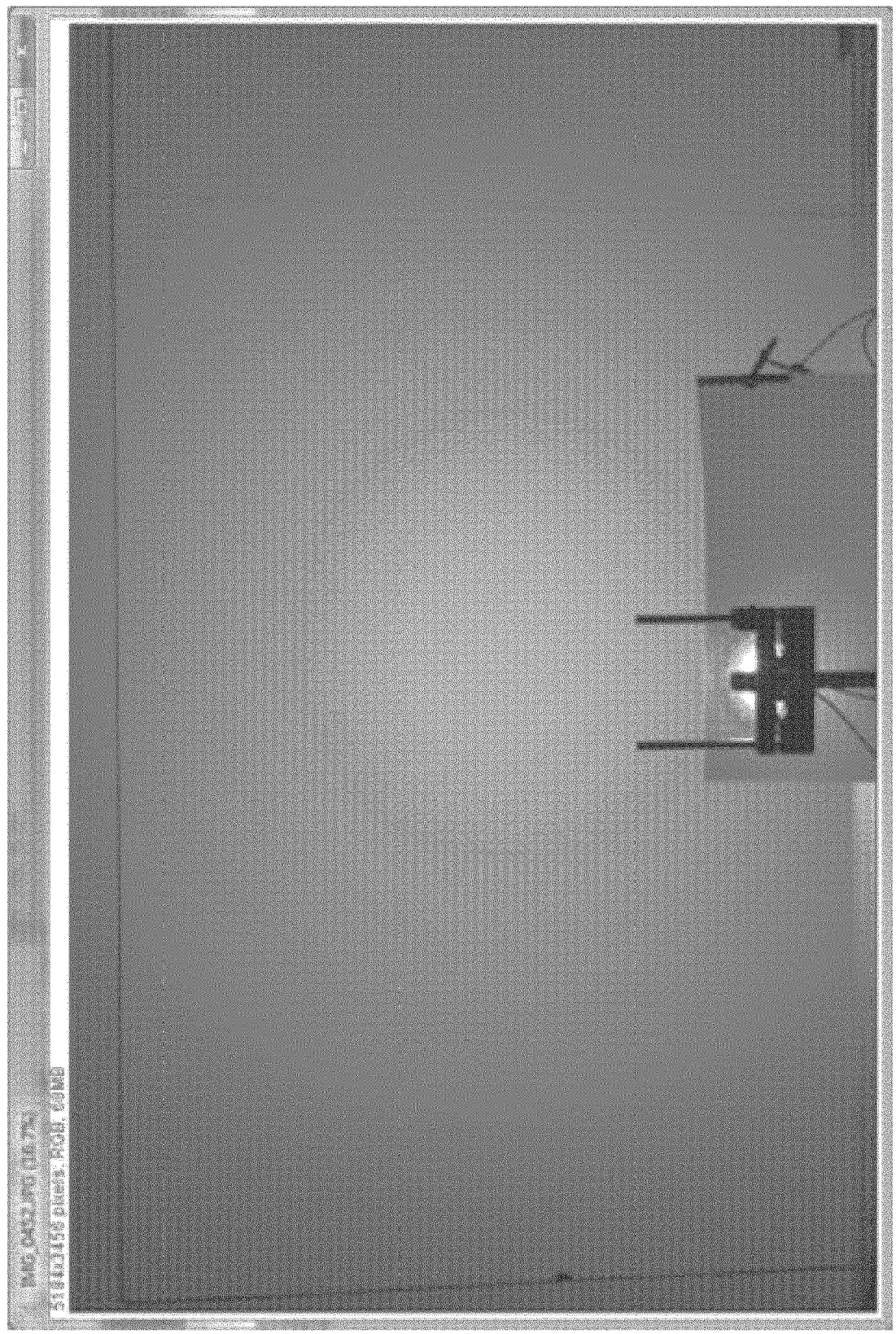
Figure 8B:
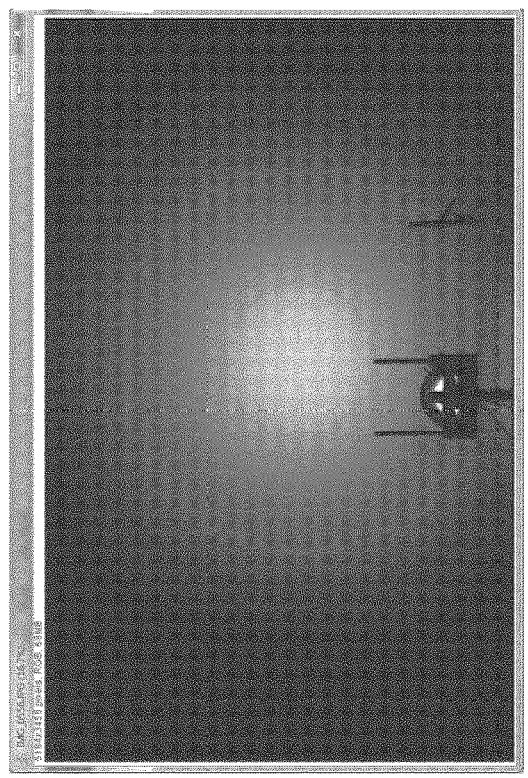
Figure 8C:
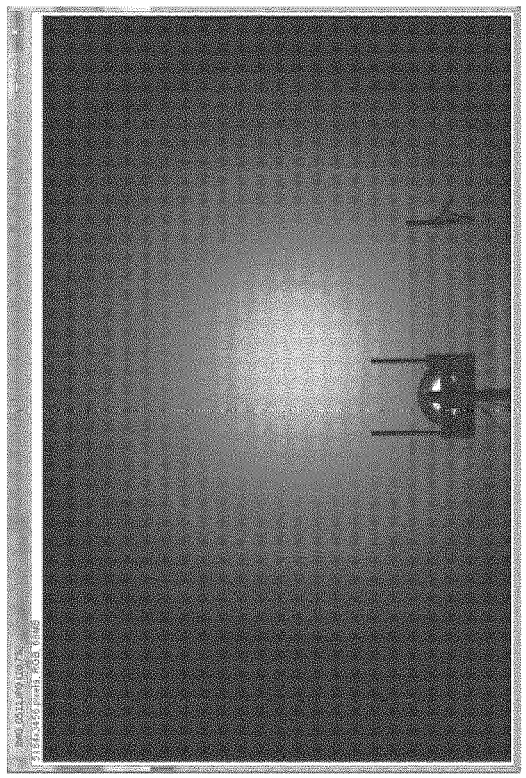
Figure 8A:
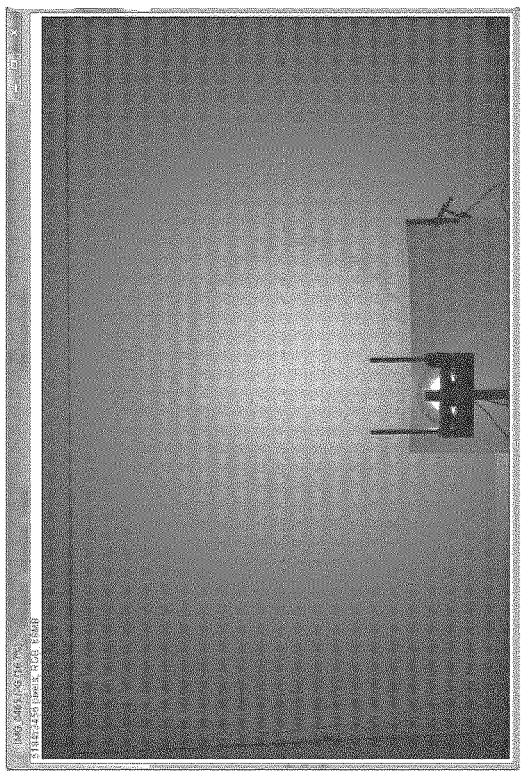
Figure 9:
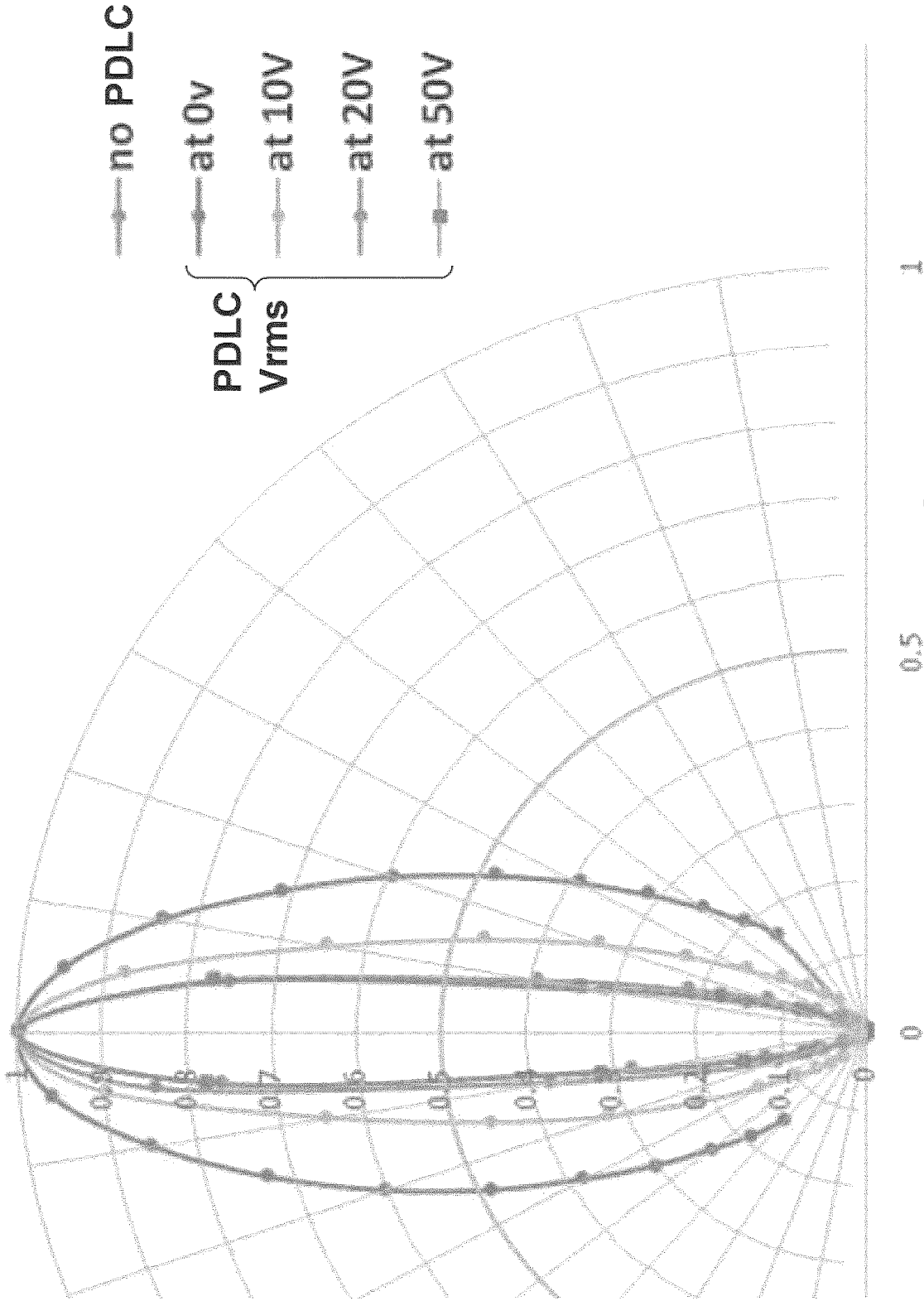
Figure 14A:
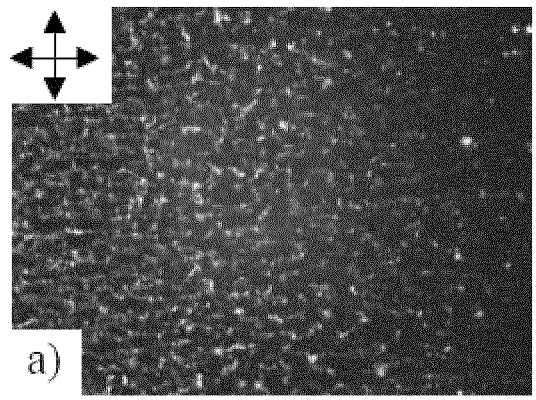
Figure 14B:
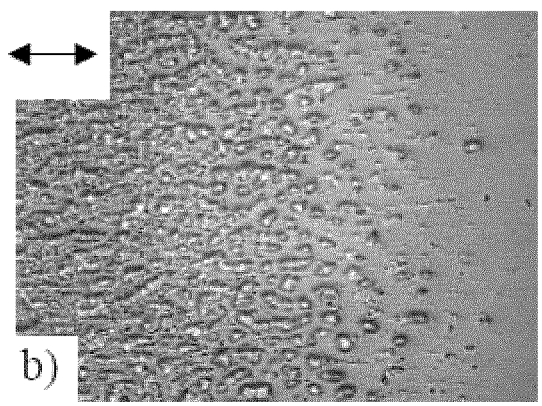
Figure 14C:
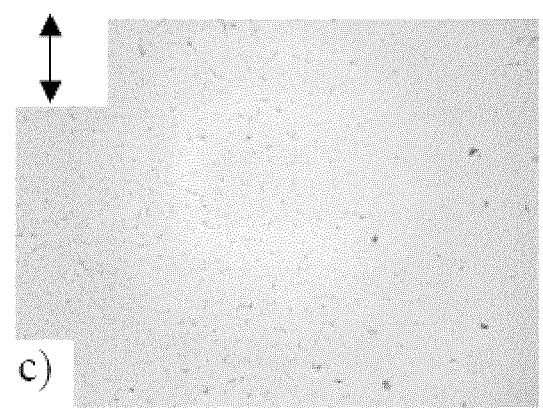
Figure 15:
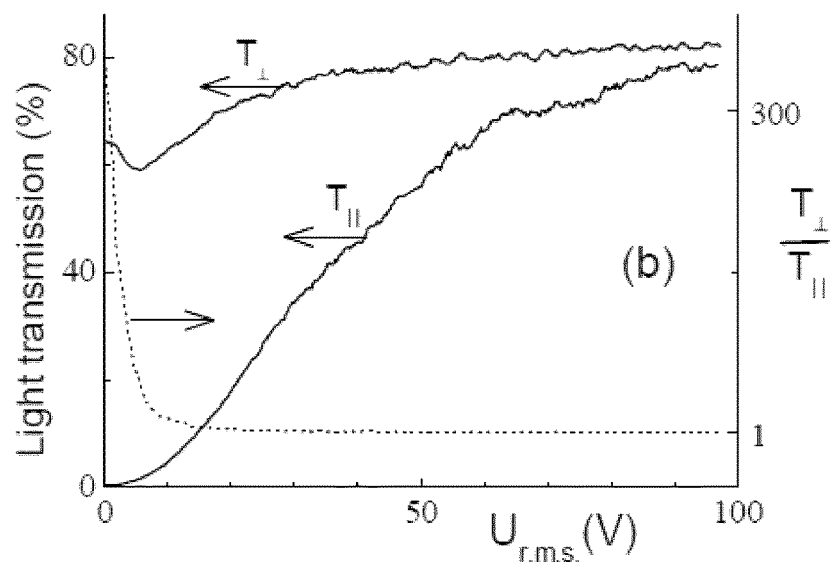
Figure 16A:
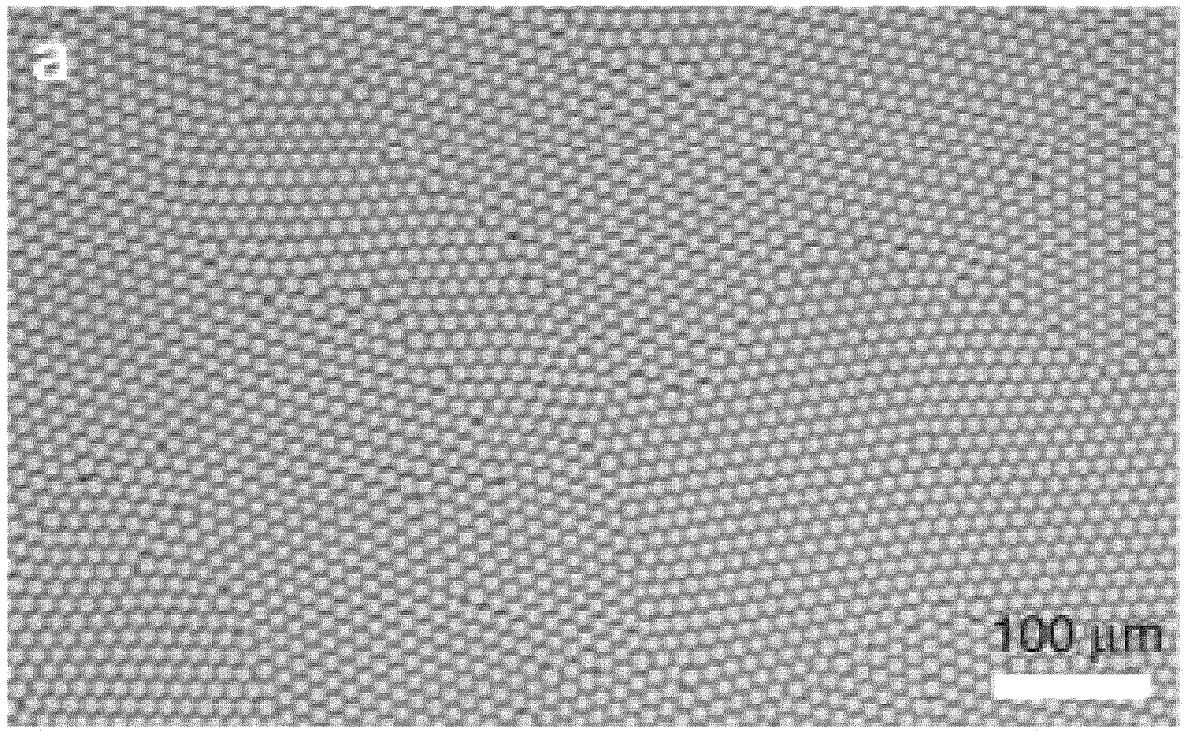
Figure 16B:
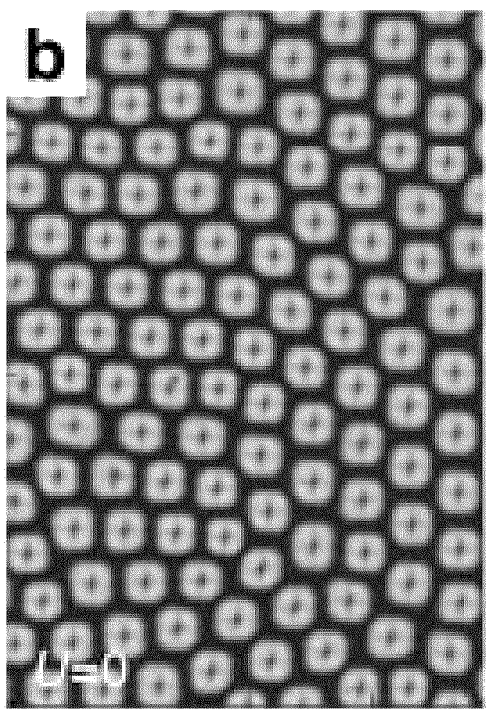
Figure 16C:
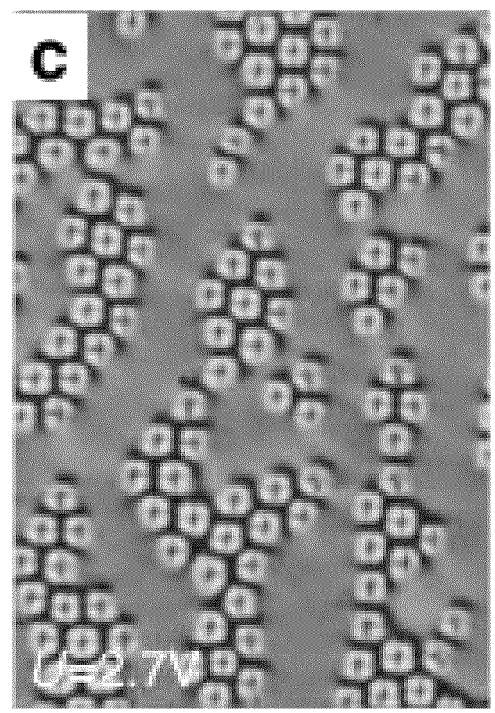
Figure 16D:
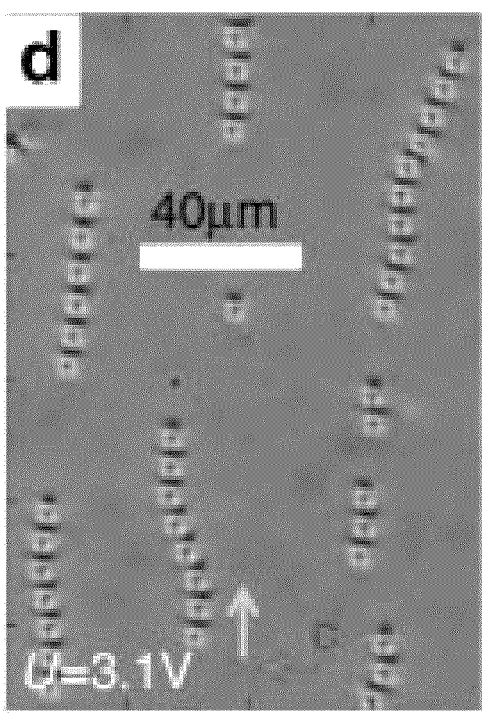
Figure 17:
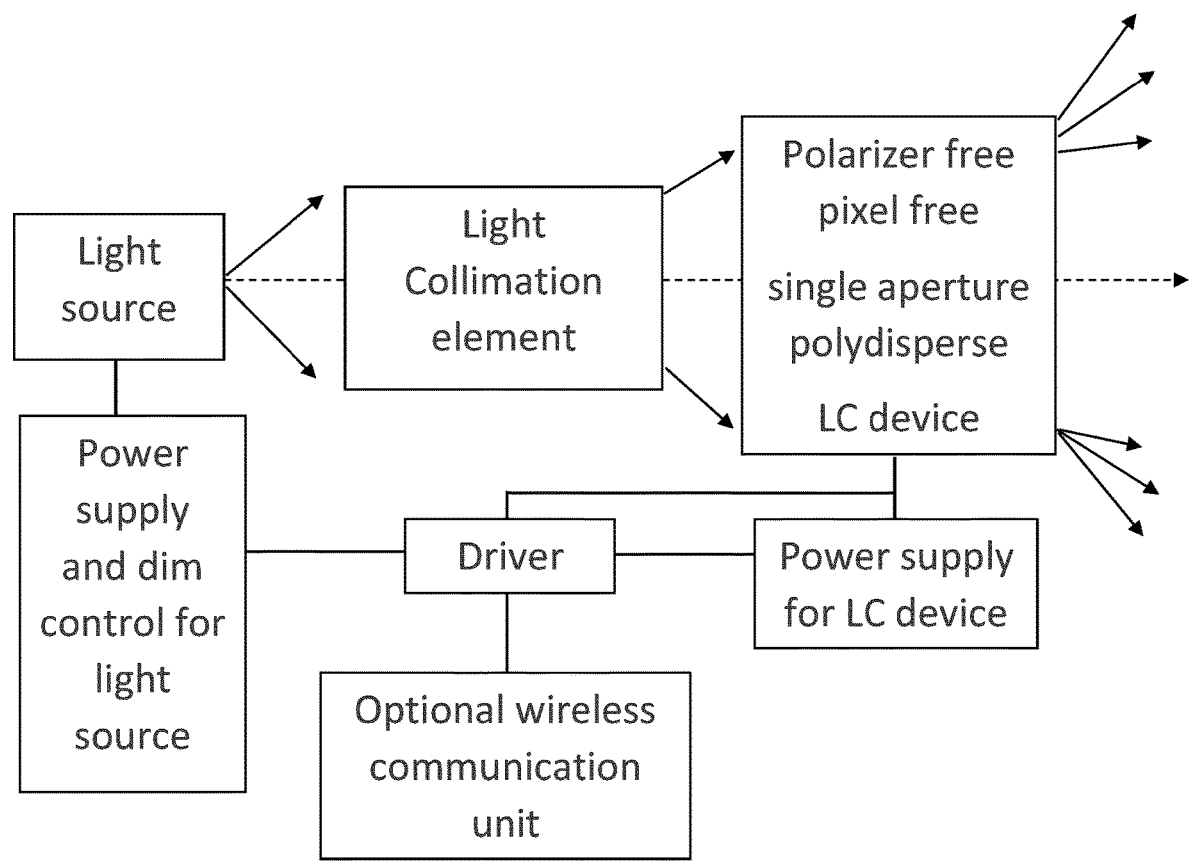
Figure 18:
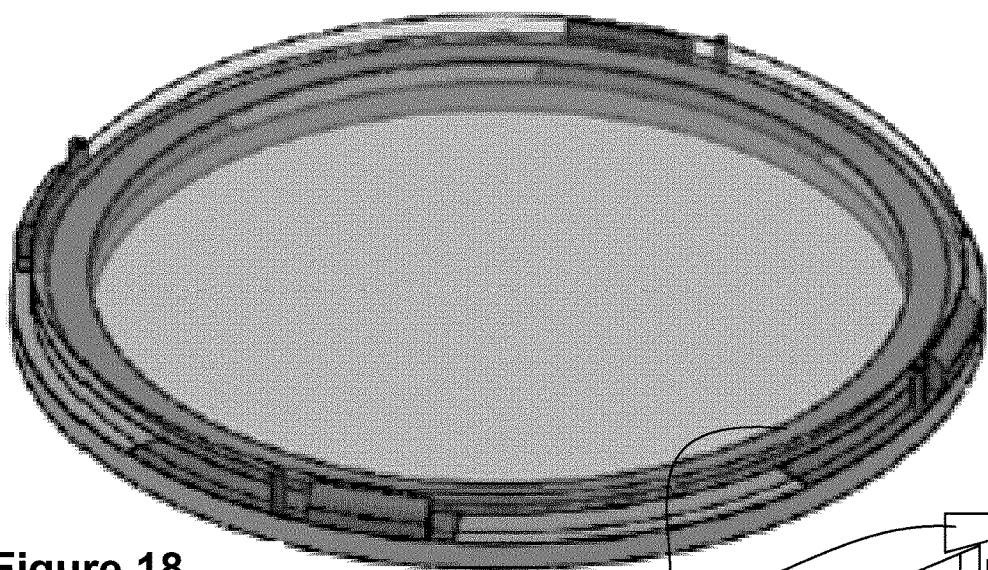
Figure 19A:
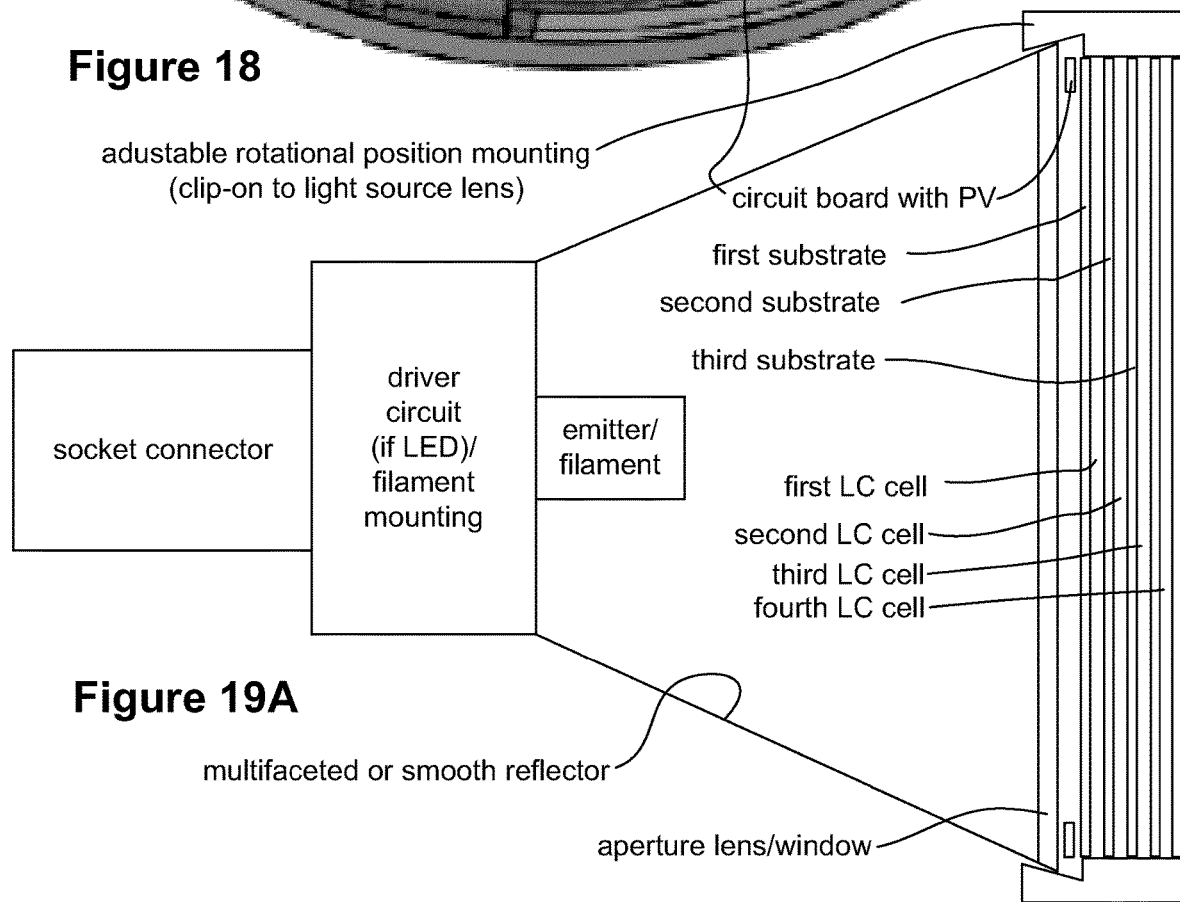
Figure 19B:
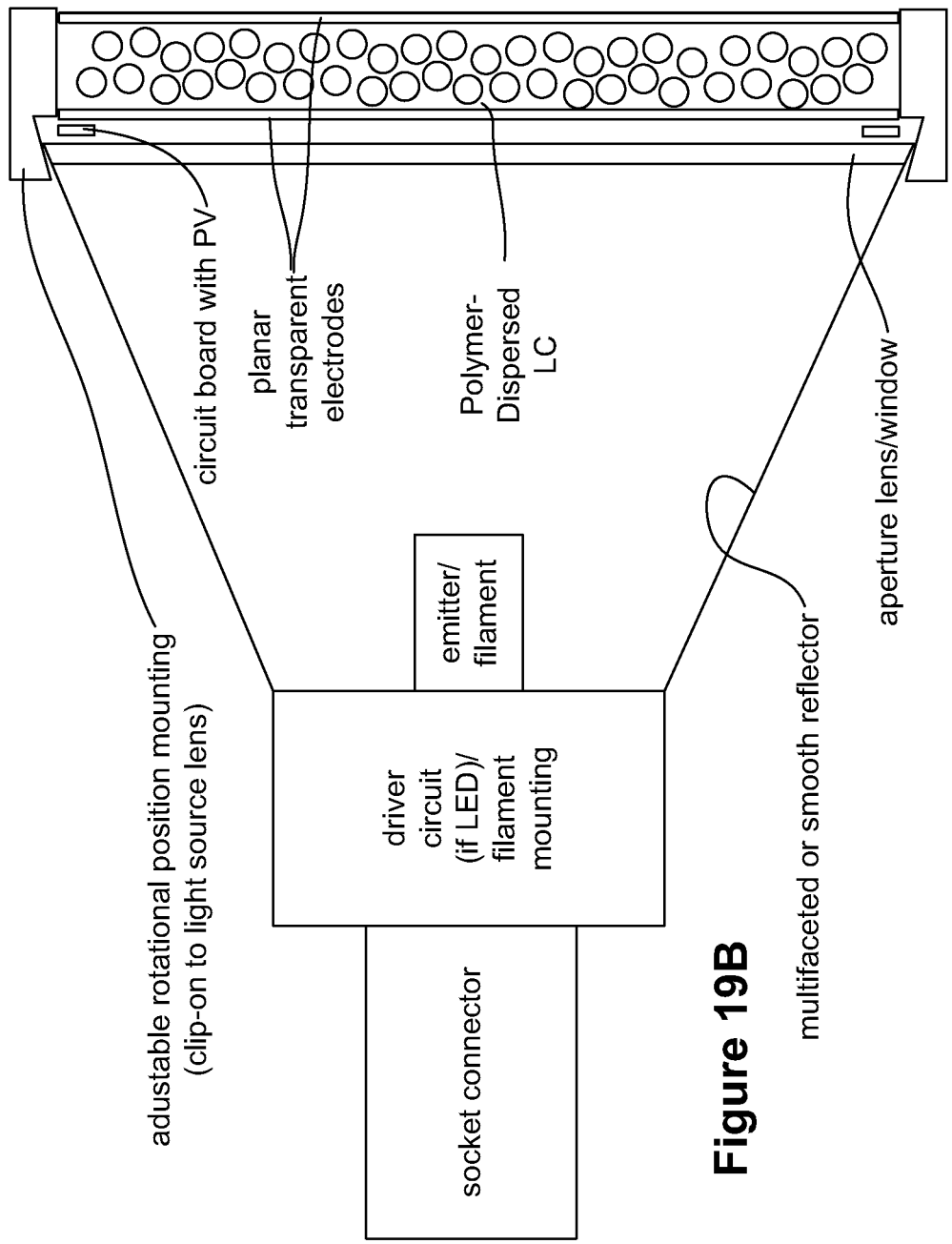
Figure 20A:
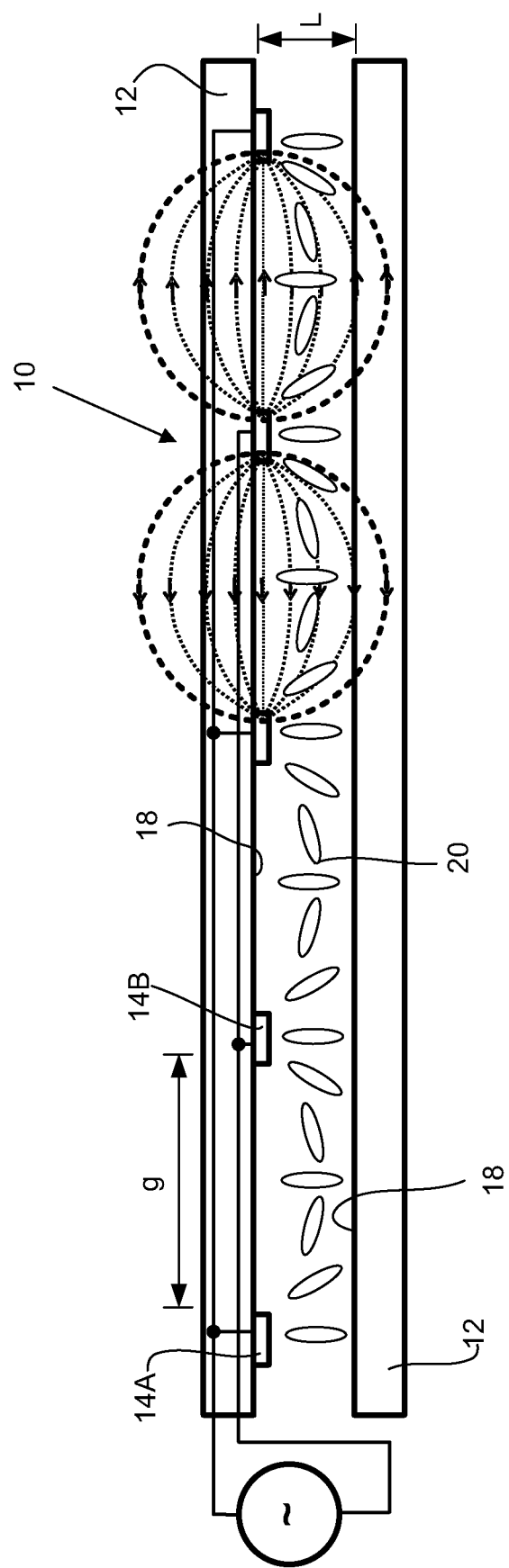
Figure 20B:
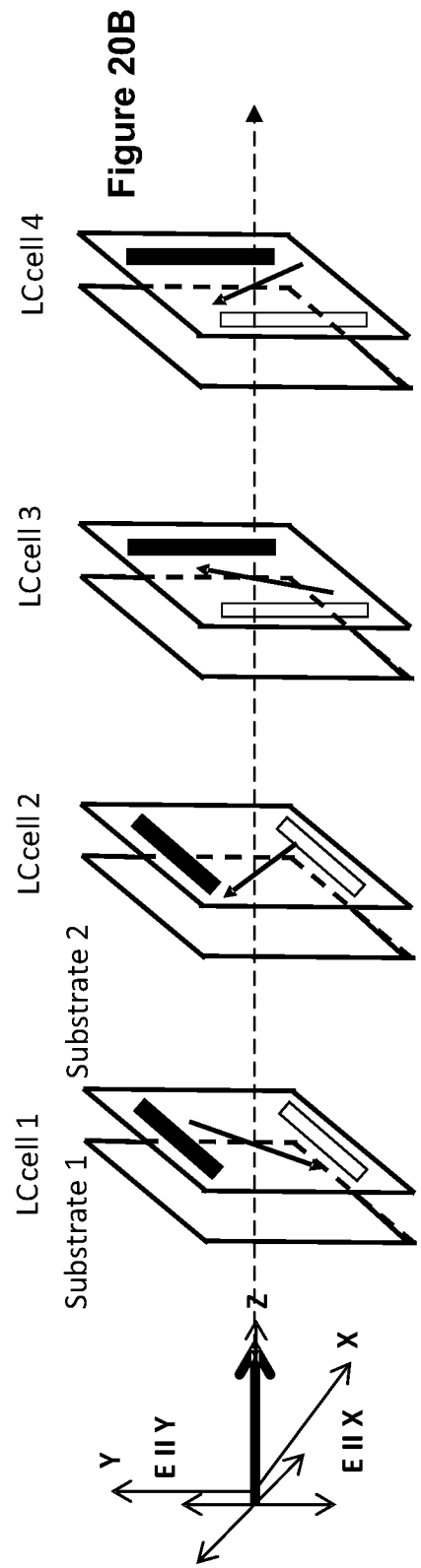
Figure 20C:
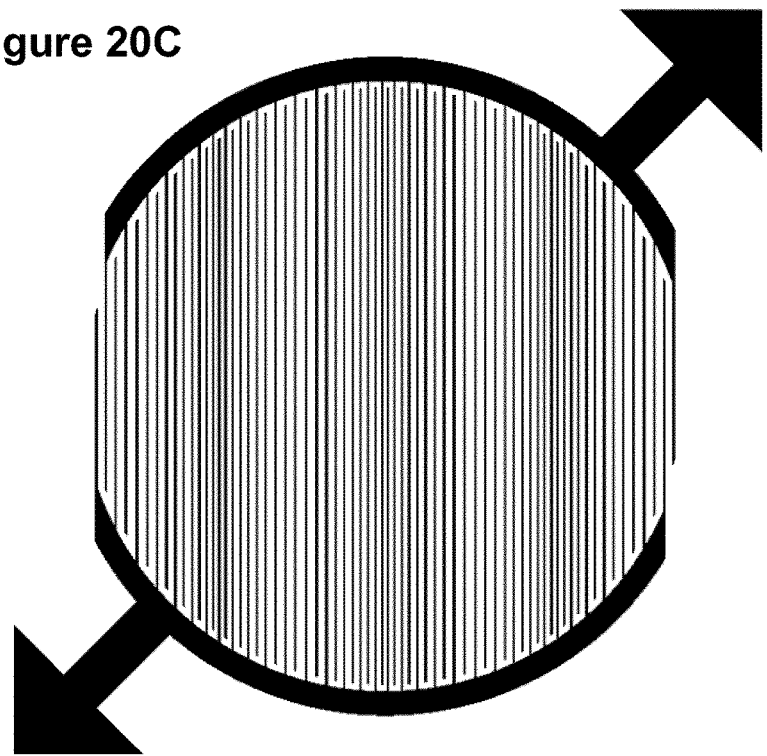
Figure 20D:
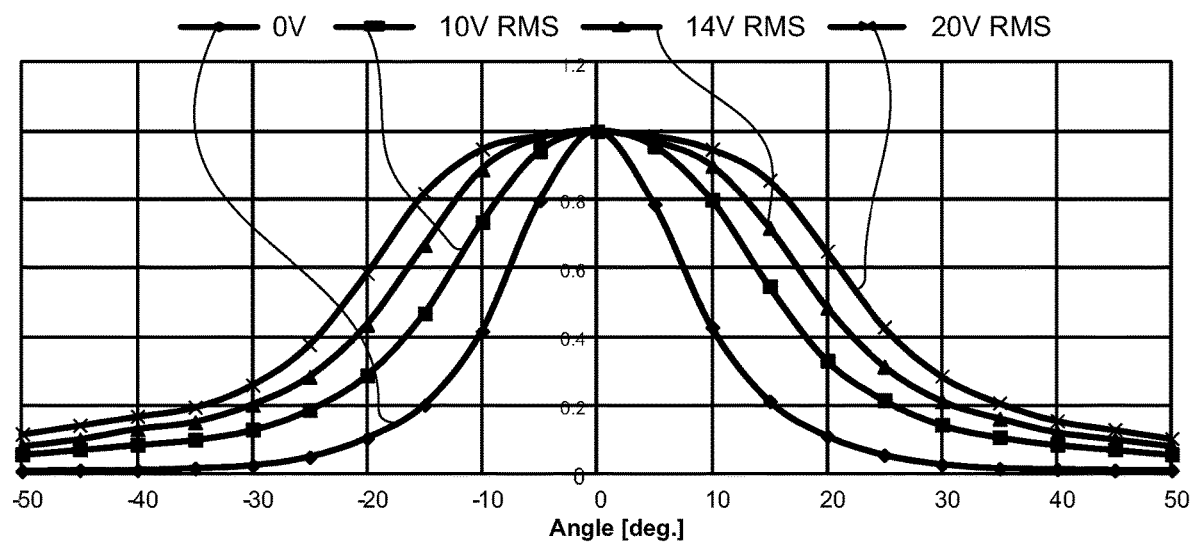
Figure 21A:
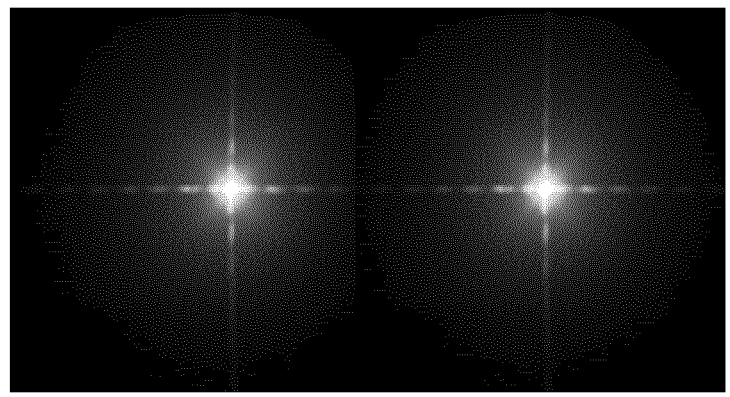
Figure 21B:
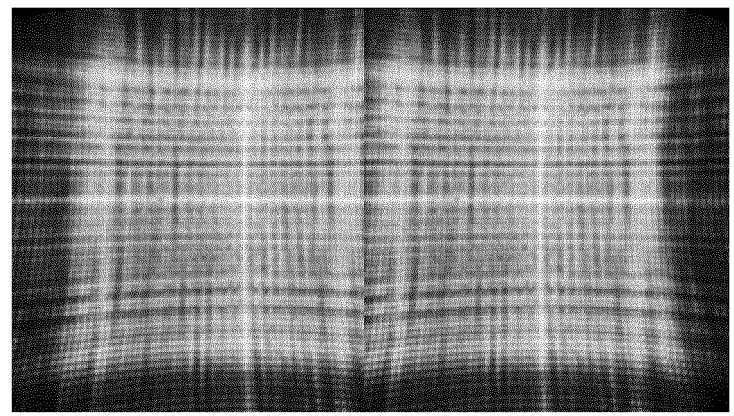
Figure 21C:
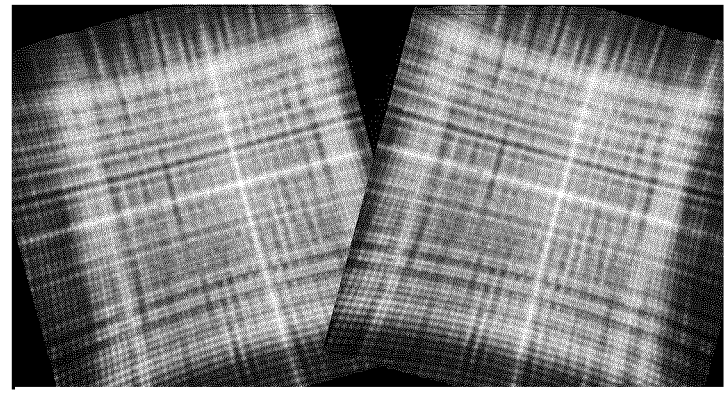
Figure 22:
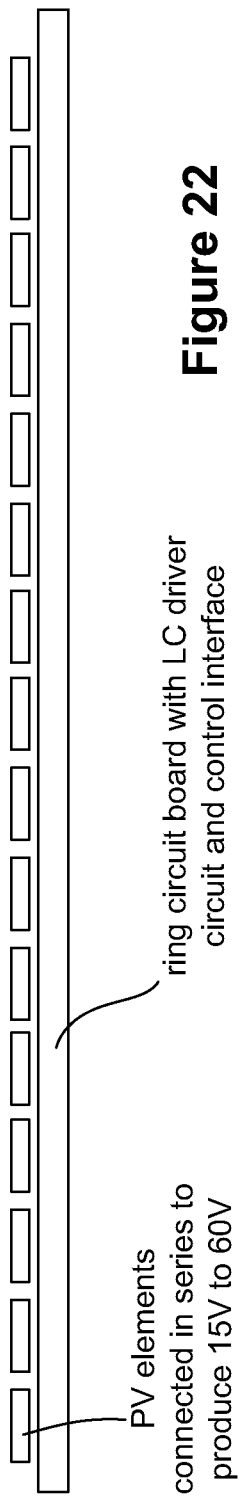
Figure 23:
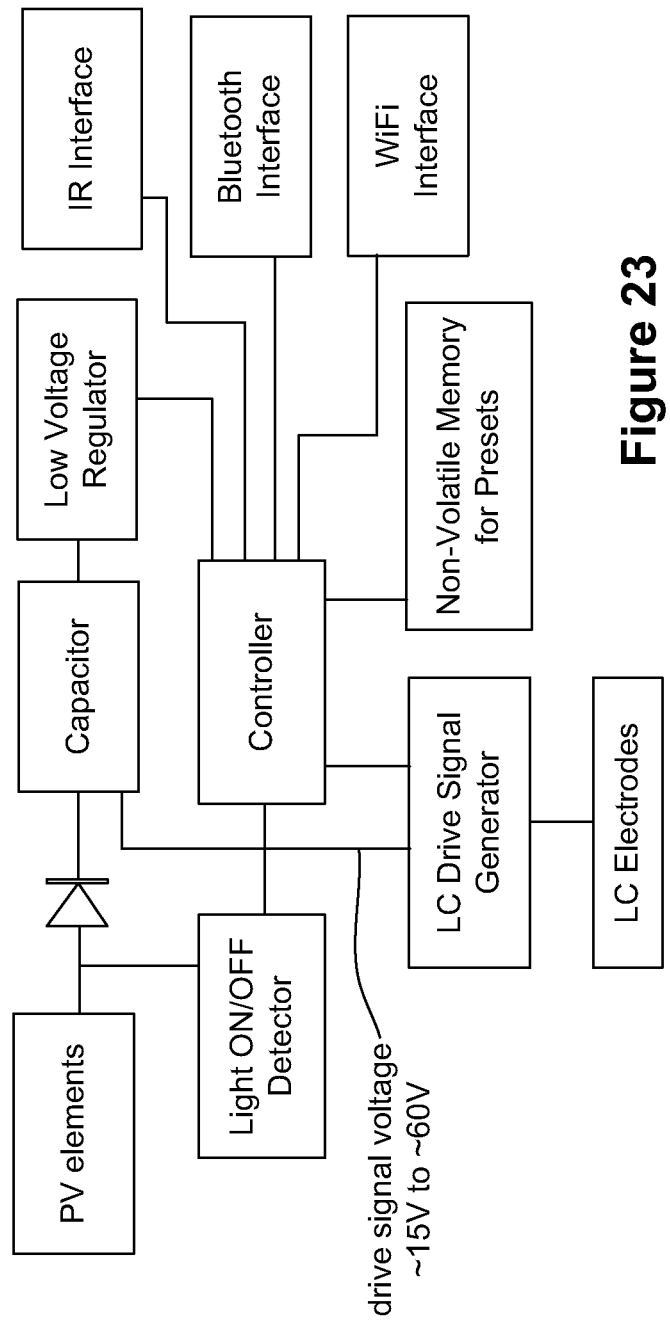
Figure 24:
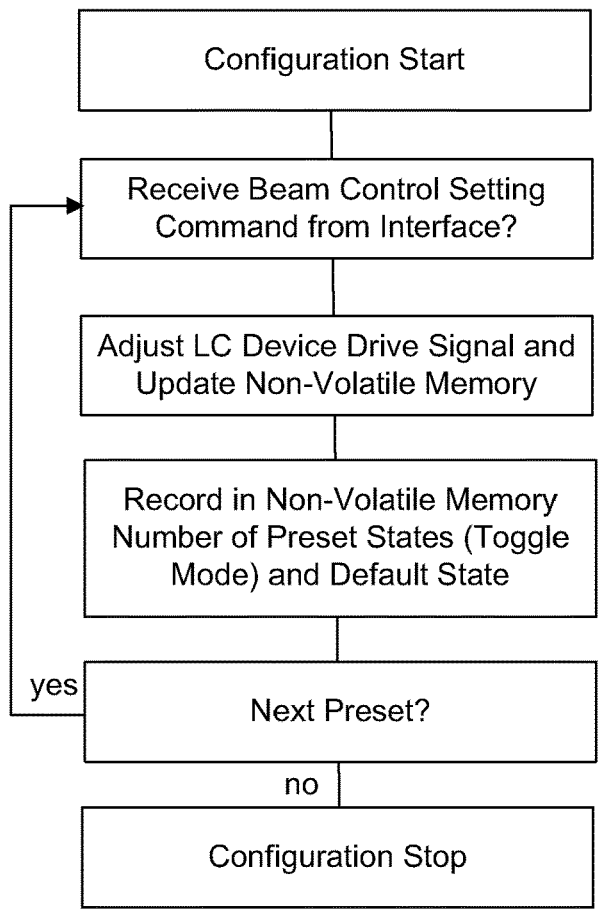
Figure 25:
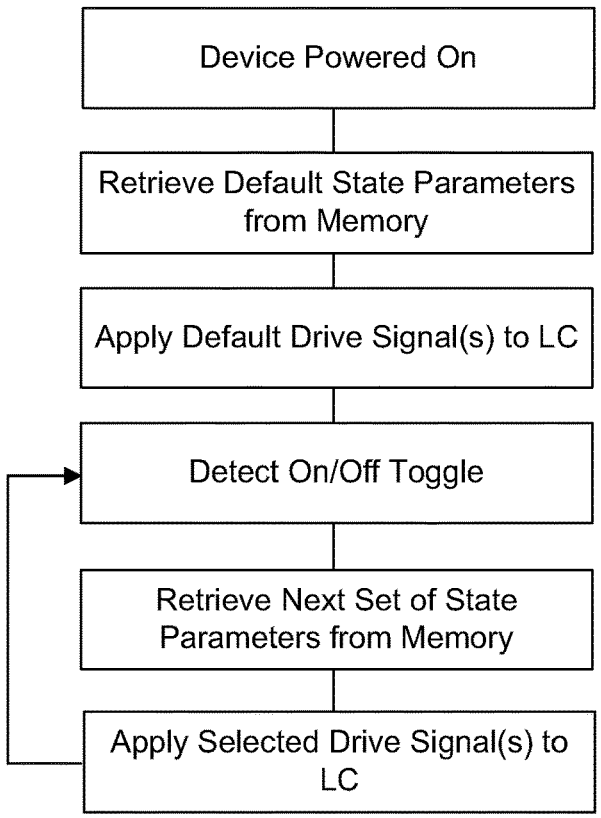
Figure 26:
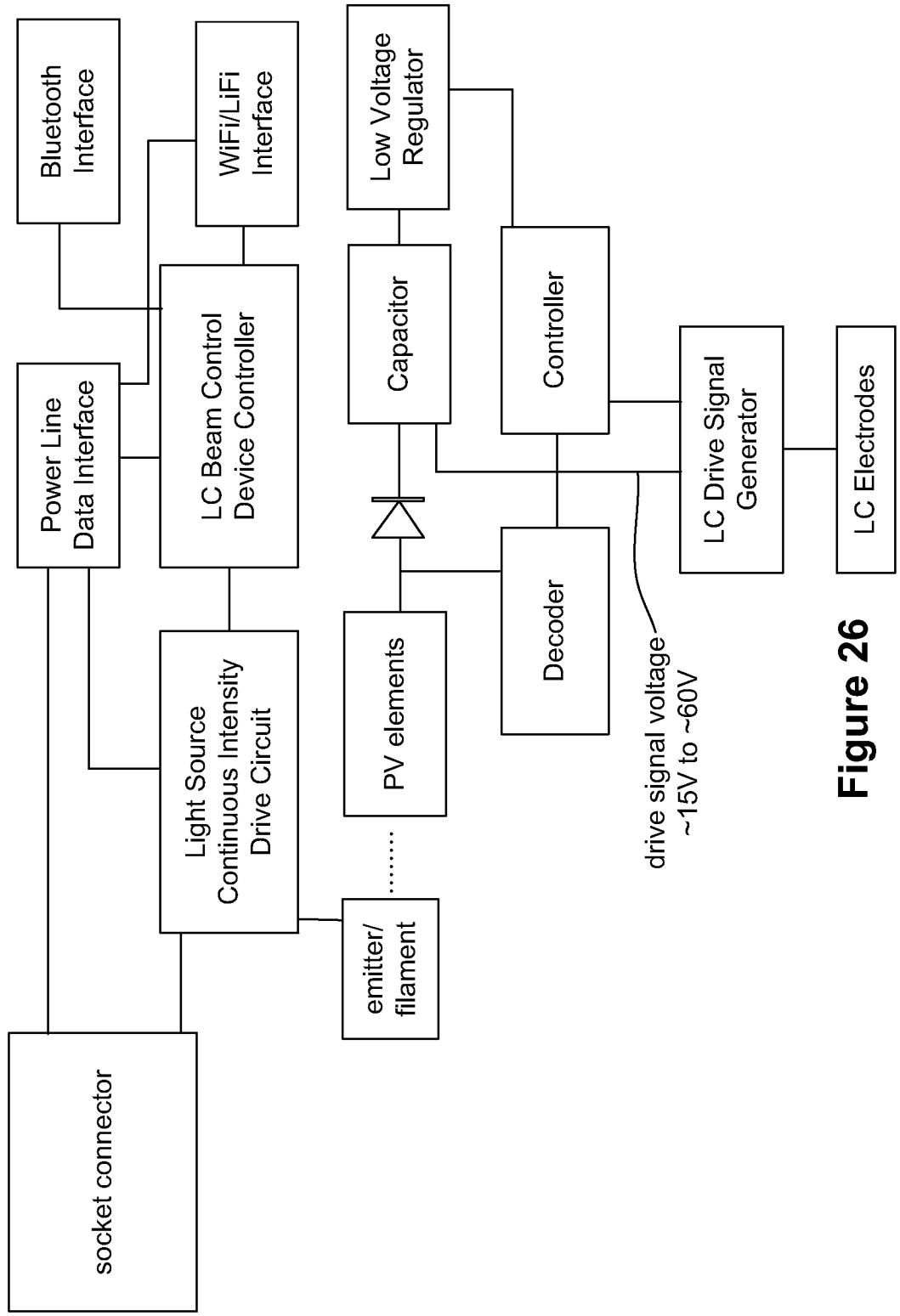
Figure 27:
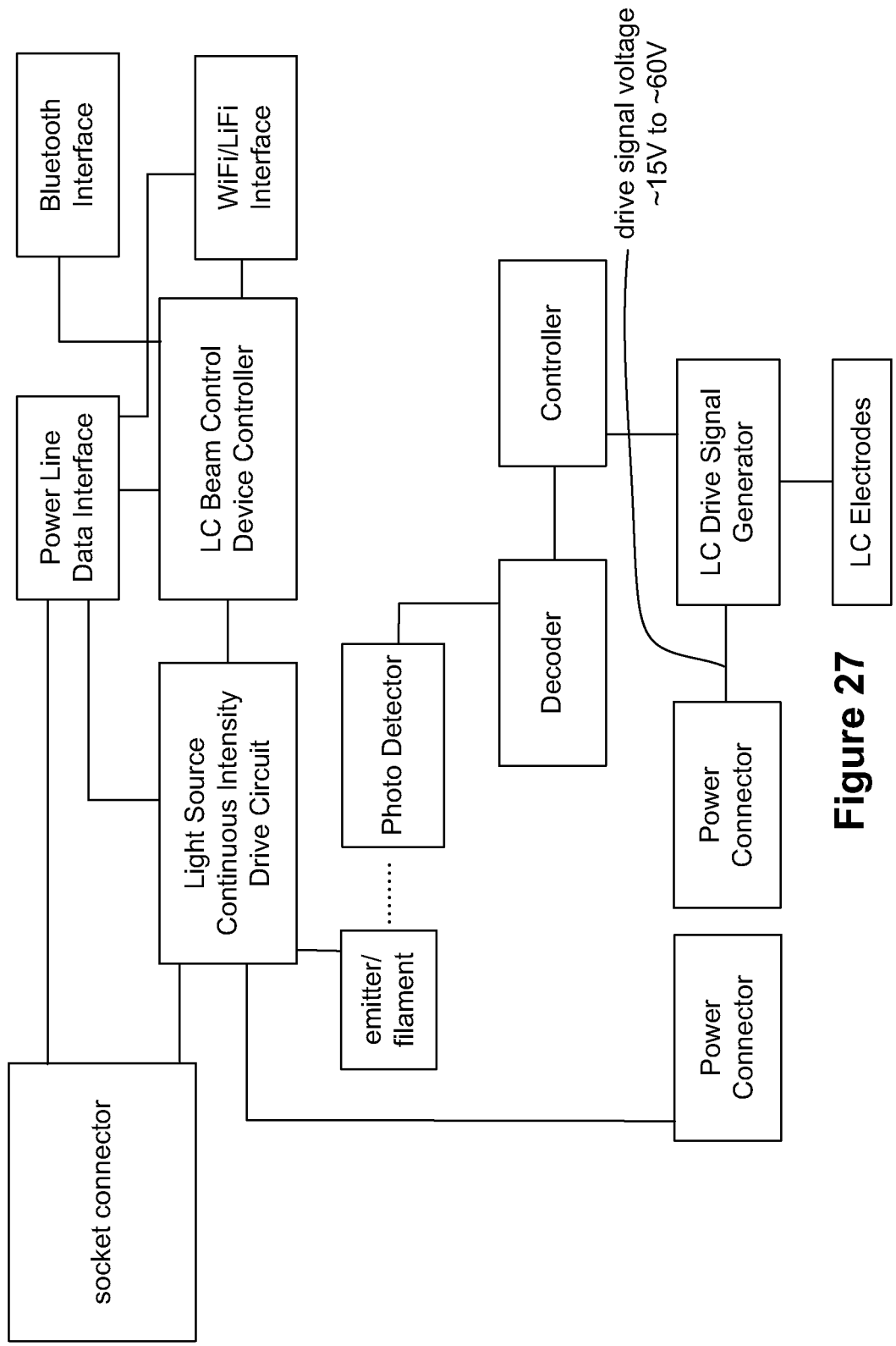

5A. The transmission is soft and takes place over relatively wide range of control voltage values thanks to the polydispersity of the material;

FIG. 6B is a graph showing the measured light transmission versus applied voltage for the device described in FIG. 5B;

FIG. 7 is an illustration of the spot light beam of the LED component shown in FIG. 1 shining through the inactive (ground state) PDLC film illustrated in FIG. 5A in accordance with the proposed solution, the light beam cast has good light dispersion quality without intensity or color non-uniformities;

FIG. 8A is another illustration of the spot light beam of the LED component shown in FIG. 1 shining through the active PDLC film illustrated in FIG. 5A driven at 10 VAC in accordance with the proposed solution;

FIG. 8B is a further illustration of the spot light beam of the LED component shown in FIG. 1 shining through the active PDLC film illustrated in FIG. 5A driven at 50 VAC in accordance with the proposed solution;

FIG. 8C is yet another illustration of the spot light beam of the LED component shown in FIG. 1 shining through the active PDLC film illustrated in FIG. 5A driven at 120 VAC in accordance with the proposed solution;

FIG. 9 is a normalized polar plot showing angular intensity distribution of a projected beam under different control conditions in accordance with the proposed solution;

FIG. 10 is a schematic diagram showing a circuit diagram of a luminaire in accordance with an embodiment of the proposed solution;

FIG. 11 is a schematic diagram showing a circuit diagram of another luminaire in accordance with another embodiment of the proposed solution;

FIG. 12 is a schematic diagram showing a circuit diagram of another luminaire in accordance with a further embodiment of the proposed solution;

FIG. 13 is a schematic diagram showing a circuit diagram of yet another luminaire in accordance with yet another embodiment of the proposed solution;

FIGS. 14A, 14B and 14C demonstrate control of polydispersity by light intensity (stronger on the left side of figures) in a PSLC layer. a) The PSLC film is between crossed polarizers, b) The PSLC film is observed through a polarizer that is parallel with the original direction of LC molecules and c) The PSLC film is observed through a polarizer that is perpendicular to the original direction of LC molecules (V. V. PRESNYAKOV, T. V. GALSTIAN, "Light Polarizer Based on Anisotropic Nematic Gel with Electrically Controlled Anisotropy of Scattering", MC&LC, Molecular Crystals and Liquid Crystals, Volume 413, 2004—Issue 1);

FIG. 15 is a demonstration of the control of polarized components of light transmission $T_\perp$, $T_\parallel$ and polarizing efficiency $T_\perp/T_\parallel$ of the polymerized PSLC sample at temperature 56° C. as a function of applied voltage (V. V. PRESNYAKOV, T. V. GALSTIAN, "Light Polarizer Based on Anisotropic Nematic Gel with Electrically Controlled Anisotropy of Scattering", MC&LC, Molecular Crystals and Liquid Crystals, Volume 413, 2004—Issue 1);

FIGS. 16A, 16B 16C and 16D are micrographs illustrating elastic self-assembly and patterning of topological particles providing scattering/dispersion centers FIG. 16A is an optical micrograph showing hexagonal ordering in dense arrays of torons, with large-area crystallites separated by grain boundaries. FIGS. 16B to 16D show polarizing optical micrographs depicting voltage-controlled transitions from (FIG. 16B) isotropic repulsive interactions mediating formation of hexagonal arrays to (FIG. 16C) weakly anisotropic attractive interactions resulting in crystallites of topological particles with smaller periodicity, and (FIG. 16D) to highly anisotropic interactions that result in chains of toron-umbilical dipoles (Paul J. Ackerman, Jao van de Lagemaat, & Ivan I. Smalyukh, "Self-assembly and electrostriction of arrays and chains of hopfion particles in chiral liquid crystals", NATURE COMMUNICATIONS|DOI: 10.1038/ncomms7012, 2015);

FIG. 17 is a schematic demonstration of the application system with such functions as light intensity dimming and broadening;

FIG. 18 is a schematic perspective view of a liquid crystal beam control device having a photovoltaic belt or ring arranged in a ring on an outer circumference of the circular device, with the liquid crystal control electrode driver circuitry and control circuitry arranged on a rim of the device;

FIG. 19A is a schematic cross-section of a device according to FIG. 18 having four LC cells mounted onto a light source;

FIG. 19B is a schematic cross-section of a device similar to FIG. 18 having a polymer-dispersed LC material mounted onto a light source;

FIG. 20A is a schematic cross-sectional view of one type of "directionally operational" LC beam broadening cell design using in-plane electrodes on a one substrate of the cell;

FIG. 20B is a schematic cross-sectional view of four LC cells according to FIG. 20A that combine to provide beam broadening control in two directions and for both linear perpendicular (or orthogonal) polarizations to act on unpolarized light;

FIG. 20C illustrates how patterned interdigitated electrodes on one substrate in one direction can be arranged on an essentially circular liquid crystal beam control device;

FIG. 20D is a plot of relative intensity as a function of angle for a given light source and different potentials applied for the device of FIG. 20B;

FIG. 21A is an experimental image of a focussed spot beam from a laser light source when a liquid crystal beam control element is off, showing two side-by-side beams from light sources directed in a parallel direction with a small spacing between them;

FIG. 21B shows the same spot beams of FIG. 21A when a liquid crystal beam control element is powered for broadening in both directions and the two liquid crystal beam control devices have their patterned electrodes commonly aligned;

FIG. 21C shows the same spot beams of FIG. 21A when a liquid crystal beam control element is powered for broadening in both directions and the two liquid crystal beam control devices have their patterned electrodes misaligned;

FIG. 22 shows a side view of a ring-shaped circuit board having PV elements mounted to one side according the embodiment of FIG. 19;

FIG. 23 shows a schematic block diagram of an example of control circuitry including multiple control options, such as infrared communications, Bluetooth, WiFi, LiFi and light toggling;

FIG. 24 illustrates the beam control pre-set programming flow control;

FIG. 25 illustrates the in use beam control state toggling flow control;

FIG. 26 is a variant embodiment of FIG. 23 in which the LC beam control device is controlled by intensity modulation of the light source and the light source has communications circuitry for receiving user commands to control the LC beam control device; and FIG. 27 is a variant embodiment of FIG. 26 in which the LC beam control device is controlled by intensity modulation of the light source and the light source has communications circuitry for receiving user commands to control the LC beam control device, in which electrical power for the LC beam control device is provided by an electrical connector of the light source.

The operation of the proposed devices may be better understood with help from the following detailed description.

DETAILED DESCRIPTION

A transmitted light beam control element is described by the inventor(s) herein, in international application WO 2016/026055 published Feb. 25, 2016, and in the corresponding US pre-grant publication 2017/0218686, the entirety of which is incorporated herein by reference. Such PDLC films provide electrically controllable light scattering. For example, FIG. 4A illustrates similar size chaotically oriented LC domains which scatter light in the ground state, wherein FIG. 4B illustrates similar sized LC domains reoriented by an applied spatially uniform electric field to permit light transmission employing index matching between the polymer matrix and ordinary refractive index of the LC material.

Figures 4A, 4B:
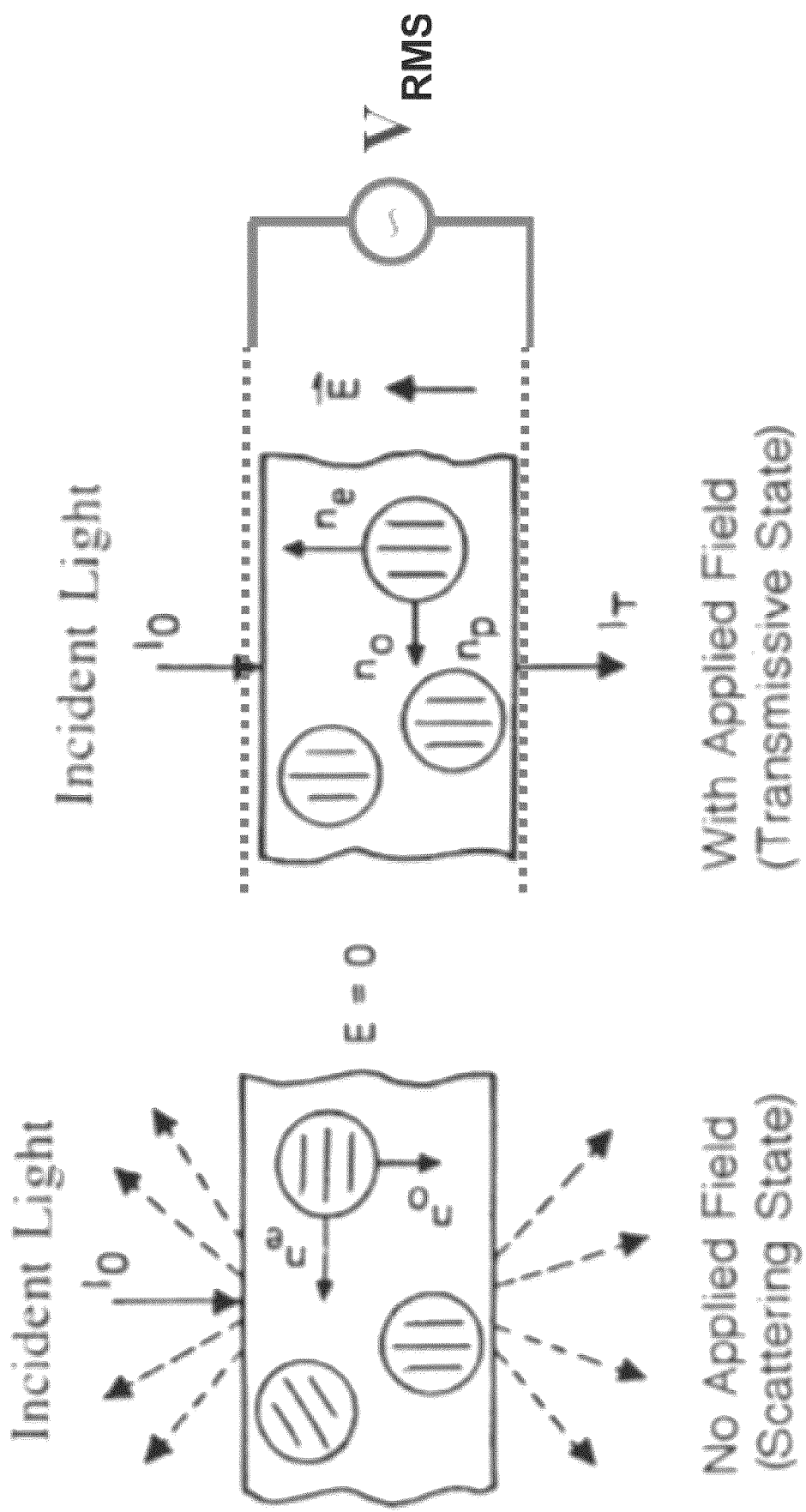
FIG. 4A is a schematic diagram illustrating a Polymer Dispersed Liquid Crystal (PDLC) film with LC domains scattering incident light in a ground state.
FIG. 4B is a schematic diagram illustrating the activated PDLC device with coordinated alignment of LC domains permitting incident light transmission when driven with an electric field.

For certainty, FIGS. 4A and 4B are highly schematic in order to simplify the presentation of the operational concepts of the proposed solution herein. In accordance with the proposed solution, a random distribution of refractive index control center sizes, generally referred to herein as polydisperse, is employed to provide variable dispersion control in a luminaire, namely an architectural lighting source.

In accordance with one embodiment of the proposed solution, FIG. 5A is a microscope image showing the abundant presence of multiple LC droplets with different sizes (demonstrating the polydisperse character of the composite material) well dispersed across the polymer matrix. For example, such materials typically contain 25% of LC, 74% of monomer and 1% of photo initiation material complex, before the photo polymerization.

FIG. 5B is a microscope image showing the relatively "rare" presence (spaced from each other) of LC droplets with low dispersity of sizes sparsely located (dispersed) across the polymer matrix.

FIG. 6A is a graph showing characterization results in terms of the variation of transmission intensity versus voltage obtained using a commercially available PDLC privacy film, having a microstructure illustrated in FIG. 5A, in front of a CREE LED source. As illustrated in FIG. 7 (for a $\frac{1}{10}$s exposure), in the ground state (no drive signal applied, voltage=0V), the PDLC film is least translucent, but not opaque (see FIG. 4A). With gradual application of a voltage controlled drive signal (RMS, having a fixed frequency), the PDLC film increases translucency becoming gradually more transparent at high voltages above 50V. FIG. 8A illustrates a $\frac{1}{15}$s exposure of the beam intensity pattern projected by the LED through the PDLC film of FIG. 5A driven at 10 VAC, while FIG. 8B illustrates a $\frac{1}{60}$s exposure of the beam intensity pattern projected by the same LED through the same PDLC driven at 50 VAC. For all intents and purposes, light transmission increases asymptotically essentially reaching a plateau above 80 VAC although the PDLC film can be safely operated at RMS voltages around 120 VAC without degradation. FIG. 8C illustrates a $\frac{1}{60}$s exposure of beam intensity pattern projected by the same LED shining thorough the same PDLC film driven at 120 VAC. Some fraction of the incident light beam intensity is lost (for the same $\frac{1}{60}$s exposure), as may be observed from a visual comparison between FIGS. 1 and 8C. The measured projected illumination intensity of the CREE LED without the PDLC element corresponding to FIG. 1 is shown in the graph of FIG. 6A for comparison. Exposure times (intensity scales) are different across the illustrations to permit visual representation herein in order to avoid white saturation (intensity burn) in the figures.

Measured light diffusion characteristics are illustrated graphically in FIG. 9. With reference to FIG. 7, which corresponds to the configuration in which the PDLC film of FIG. 5A scatters light at maximum level, represented in FIG. 9 as the largest outer oval. The gradual increase of the RMS voltage level of the driving signal applied to the PDLC film reduces the light scattering thus reducing light divergence (FIG. 8C) to almost its original value without the PDLC film (FIG. 1) (however of a lesser intensity as shown in FIG. 6A).

From a technical perspective, FIG. 9 depicts a (standard) normalized polar plot of broadening angles obtained from intensity measurements at different angular positions of the CREE LED light source of FIG. 1 shining through the PDLC film of FIG. 5A for different PDLC element driving conditions. In the ground state, with a 0 Vrms "applied" to the PDLC film, the projected light beam exhibits the broadest light intensity distribution (FIG. 7) corresponding to the largest outer oval graph representative of 48.8° FWHM. Applying a 10 Vrms drive signal across the PDLC film, reduces the degree light beam broadening to 28.0° FWHM corresponding to the second oval graph. Increasing the drive signal voltage applied to the PDLC film to 20 Vrms further reduces the degree of light beam broadening to 17.3° FWHM. Further increasing the drive signal voltage applied to the PDLC film to 50 Vrms reduces degree light beam broadening to 16.2° FWHM, the corresponding graph is almost indistinguishable on the plot of the graph corresponding to the inherent dispersion of the LED source spot beam (without the PDLC) film having a measured broadening angle of 15.6° FWHM. As it may be seen, at 50 Vrms the PDLC alignment (FIG. 4B) is almost saturated and almost as transparent as possible (see FIG. 6A). These light broadening results represent significant improvements overall, providing a maximum added divergence angle >33° (or a broadening factor >3; measured by dividing the divergence angle at ground state by the divergence angle at maximum voltage applied) which is very encouraging, obtaining rather large broadening angles with quite good optical quality.

In comparison, FIG. 6B is a graph showing the measured light transmission versus applied voltage for the device described in FIG. 5B. The transmission change is abrupt and takes place over relatively narrow range of control voltage values because of insufficient polydispersity of the material. In addition, a hysteresis loop is observed, which can have some applications, however for general illumination applications the hysteresis introduces complications in the control of such device.

Of worthy note is a limitation of the acceptance angle of the detector employed to obtain the results presented; should the acceptance angle of the detector have been any larger, a broader beam dispersion or a more gradual beam intensity drop-off would have been measured (both of which would have confirmed better measured results). The low acceptance angle of the detector is believed to be responsible for a rather low measured light transmission through the PDLC film, illustrated as the difference between the asymptote intensity value depicted in FIG. 6A compared to the measured intensity of the LED source without the PDLC film (about 82% transmission efficiency). It is believed that better light integration including light propagating at (shallower) broader angles (capturing light scattered by the PDLC film at higher scattering angles) would show a measured transmission closer to about 90% as PDLC films are not expected to absorb much light at high scattering angles.

One of many advantages of employing the proposed combination of a PDLC film element and an LED light source is manufacturing cost efficiency as PDLC films can be less costly to produce than LC beam shaping device arrays. Manufacturing tolerances of PDLC films for controlled LED beam dispersion applications can be reduced compared manufacturing tolerances required for PDLC lensing elements or PDLC privacy window panes. Lower manufacturing tolerances, if random in nature, can induce beam dispersion which is desirable given the limits of spot beam LED sources. Wafer level manufacturing of flat uniform transparent electrode layers is preferred over required precise deposition of electrode strips tens of microns wide. ("Flat uniform" can include uniform sparsely deposited flat electrode layers.)

FIG. 10 illustrates, in accordance with one embodiment of the proposed solution, an actively controlled PDLC film, driven directly from the mains, employed directly and exclusively in front of a spot beam LED source to provide variable dispersion control. When the main switch is closed, the LED light source creates the incident beam providing a spot beam. The diffusion control switch controls beam broadening by selecting the broadened output light beam (FIG. 7) when the switch is open or selecting spot beam output beam when the switch is closed (FIG. 8C). It is understood that FIG. 10A is highly schematic, for example a current limiter electrical element is not shown to limit current delivered to the PDLC film. Preferably the PDLC film includes transparent flat uniform electrode layers. The mains can be one of 50 Hz and 60 Hz 120/110 VAC power line. In accordance with the implementation of this embodiment of the proposed solution illustrated in FIG. 10, one PDLC film is employed preferably driven full-cycle (see FIG. 6A) with the PDLC film connected between the line and neutral of the mains.

In accordance with another embodiment of the proposed solution, an actively controlled PDLC film, driven from the mains via a Pulse Width Modulation (PWM), is employed directly and exclusively in front of a spot beam LED source to provide variable dispersion control. While details of the PWM controller are not provided herein, a person of skill in the art would understand such a PWM controller, essentially replacing the CTRL in the schematic circuit, could include a thyristor type dimmer or a wave counter in series with a high frequency signal generator. In accordance with an implementation of the proposed solution, preset PWM active fractions are selected by cycling therethrough by cycling main power. In accordance with another implementation of the proposed solution, the selector switch can be incorporated into the face of the luminaire, for example a selector ring.

In accordance with another implementation of the first embodiment illustrated in FIG. 11, control can be provided by a selector (CTRL) configured to select between dispersion presets provided by: disconnecting the PDLC film from the power line to provide the broadest output beam (FIG. 7), connecting the PDLC film in parallel with the mains to allow essentially the spot light beam of the LED pass trough (FIG. 8C), connecting the PDLC film to the mains through a rectifier which essentially provides an output beam switching between the broadest output beam and the spot light beam with half duty cycle, and connecting the PDLC film between ground and line which essentially reduces the applied voltage to half the line voltage (FIG. 8B). In accordance with an implementation of the proposed solution, the presets can be selected by cycling therethrough by cycling main power. In accordance with another implementation of the proposed solution, the selector switch can be incorporated into the face of the luminaire, for example a selector ring.

FIG. 12 illustrates, in accordance with another embodiment of the proposed solution, a pair of preferably dissimilar PDLC films, electrically connected in series, employed for example driven directly from a 120/110 VAC or 240/220 VAC mains. Without limiting the invention, the dissimilarity between the PDLC films can be the thickness of the LC layer or the polydispersity of LC droplets or the chirality of the LC material. The selector switch can be connected electrically between the PDLC films to achieve a variety of output beams. When the selector is in the electrically floating position the full mains voltage is applied full-cycle across the pair of PDLC films in series, with each PDLC film imparting dispersion to the incident beam. Due to the dissimilarity between the PDLC films the beam incidence order through the PDLC films can provide different output beams. The selector can be configured to electrically short out one of the PDLC films which essentially configures the shorted PDLC film to provide a corresponding broadest output beam while full mains voltage is applied across the other PDLC film which provides essentially little beam dispersion. Due to the dissimilarity between the PDLC films the output beam dispersion can be different depending on which PDLC film is sorted. With the selector connected to ground, essentially half of the mains voltage can be applied across each PDLC film. When the control selector is connected to one of two oppositely connected rectifiers, a corresponding one PDLC film can be connected to ground during half of the cycle while both PDLC films are connected across the mains during the other half cycle. Because the PDLC films are dissimilar, output light beams providing different lighting conditions can be provided depending on which rectifier polarity is selected. In accordance with an implementation of the proposed solution, the presets can be selected by cycling therethrough by cycling main power. In accordance with another implementation of the proposed solution, the selector switch can be incorporated into the face of the luminaire, for example a selector ring.

FIG. 13 illustrates, in accordance with yet another embodiment of the proposed solution, a pair of preferably similar PDLC films, electrically connected in series, each PDLC film adding dispersion to the spot beam of a corresponding spot beam LED light source, employed for example driven directly from 120/110 VAC. Each LED and PDLC film pair is configured to be oriented to project the corresponding output beam in a different direction providing non-necessarily overlapping projections. Without limiting the invention, the orientation of the beams projected can be set for example via a preset stops on at least one gimbals mechanism (not shown). Such a combination can employ input voltages available in architectural and industrial lighting applications while providing uniform luminaires configured to cast differently oriented output beams.

One of the advantages of using such a PSLC film, instead of PDLC film, is the very limited presence of polymer which is known to be relatively sensitive to UV light. Another advantage is the relatively low voltages needed to drive the PSLC element.

In accordance with another embodiment of the proposed solution, FIG. 14 illustrates a mechanism of controlling the polydispersity of LC clusters in a PSLC composite material, typically containing 95% of LC, 4% of monomer and 1% of photo initiation material complex, before the photo polymerization as described in from V. V. PRESNYAKOV, T. V. GALSTIAN, Light Polarizer Based on Anisotropic Nematic Gel with Electrically Controlled Anisotropy of Scattering, MC&LC, Molecular Crystals and Liquid Crystals, Volume 413, 2004—Issue 1, the entirety of which is incorporated herein by reference. In FIG. 14a) the PSLC film observed is between crossed polarizers. In FIG. 14b) the PSLC film is observed through a polarizer that is parallel with the (ground state) original direction of LC molecules. And, in FIG. 14c) the PSLC film is observed through a polarizer that is perpendicular to the (ground state) original direction of LC molecules. For certainty, observation of the PSLC film through polarizers is for illustration purposes only; the proposed use of the PSLC film with the LED source is without any such polarizers.

FIG. 15 illustrates, in accordance with yet another embodiment of the proposed solution, a mechanism of controlling the light transmission by using another polydisperse PSLC layer. In this case, a very strong scattering and hence beam broadening is achieved mainly for one polarization mode of light (almost a factor of 300 is demonstrated). If desired, two such PSLC layers may be used with their ground state optical axes being perpendicular to each other (both being perpendicular to the light's original incident propagation direction). Such double layered device can control the divergence of unpolarized light.

FIG. 16 illustrates, in accordance with yet another embodiment of the proposed solution, a mechanism of controlling the light transmission by using a micro or nano particle dispersed LC layer as described by Paul J. Ackerman, Jao van de Lagemaat, & Ivan I. Smalyukh in "Self-assembly and electrostriction of arrays and chains of hopfion particles in chiral liquid crystals", NATURE COMMUNICATIONS|DOI: 10.1038/ncomms7012, 2015, the entirety of which is incorporated herein by reference. Elastic self-assembly and patterning of topological particles providing scattering/dispersion centers is illustrated. FIG. 16A is an optical micrograph showing hexagonal ordering in dense arrays of torons, with large-area crystallites separated by grain boundaries. FIGS. 16B to 16D are polarizing optical micrographs depicting voltage-controlled transitions from (FIG. 16B) isotropic repulsive interactions mediating formation of hexagonal arrays to (FIG. 16C) weakly anisotropic attractive interactions resulting in crystallites of topological particles with smaller periodicity, and (FIG. 16D) to highly anisotropic interactions that result in chains of toron-umbilical dipoles. The red arrow in FIG. 16D denotes the orientation of the far-field c and the green arrow depicts orientation of the toron-umbilical dipoles. In this case, a very strong scattering and hence a broadening may be achieved with the variation of voltage. If desired, two such layers may be used with their ground state optical axes being perpendicular to each other (both being perpendicular to the light's original incident propagation direction). In this case, the double layered PSLC device can control the divergence of unpolarized light.

FIG. 17 schematically illustrates, in accordance with yet another embodiment of the proposed solution, a system of controlling the light transmission divergence angle and intensity by using a one of described above LC devices. It will be appreciated that either lenses or reflective optics (or both in combination) can be used to provide a collimated spot beam from a light source.

With appropriate changes, the proposed solution providing a controllable beam shape light source module including a controllable light beam control module and a light source module providing the initial light beam, can be configured to adapt the light source module to a scanner light source, a camera flash, an architectural, automobile or industrial lighting device.

For certainty, there is no intent in the present description to exclude a combination including at least one LED light source, with a dynamically controlled LC beam shaping device element (with multiple electrodes) and a dynamically controlled polydisperse LC film element. In such embodiments, LC beam shaping device control can be integrated with LED power conversion components while parallel polydisperse LC film element control is provided from the mains.

In one embodiment illustrated in FIGS. 18 and 19A, a liquid crystal beam control device has a circular aperture for mounting to a light source having a circular aperture. It will be appreciated that non-circular apertures can be provided. The device includes a mounting frame that secures a photovoltaic support, for example a circuit board ring, as well as the substrates for the liquid crystal cells. It will be appreciated that the photovoltaic elements can be supported by the LC element substrates instead of a separate substrate, as is the case with a circuit board. While the device can be attached directly to an aperture lens or window of a spot beam light bulb (LED type, fluorescent or incandescent) as shown, the device can be attached to a light source fixture that is separate from the light emitting components. Also, the shape of the LC beam control device and aperture can be different from circular. Some LED spot beam light sources provide a number of LED emitters arranged with lenses for directing light in a spot beam from each emitter, and in such cases, the LC beam control device can have a single aperture covering all such spot beams or a number of apertures for each spot beam. Some other LED light sources provide, typically using an array of LED devices, a linear source, and the LC beam control device and aperture can be adapted to such geometries.

The adjustable rotational position mounting shown in FIG. 19A is optional, however, it is practical to be able to adjust the rotational position of a spot beam when the LC device is rotationally dependent, such as providing beam steering or broadening in a given direction. In this way, when the user wishes for the beam to be broadened or steered in a given direction (stretching), then the direction can be set using the mounting without having to adjust additionally (for example manually) a rotational position of the light source, as for example by adjusting the socket connection.

The structure or type of LC beam control device can vary. In FIG. 19A, there is shown schematically a type of LC beam broadening device that has two LC cells and is able to broaden unpolarized light in two directions at the same time.

Other LC devices, such as polymer dispersed liquid crystal elements as shown in FIG. 19B can be used to controllably introduce diffusion into a beam, in which the action of a single layer will act on both polarizations and creates a substantially uniform diffusion, so that it is rotational direction independent. With a PDLC device, LC material fills pockets in a polymer matrix material, and the LC material is unordered in the ground state. This causes dispersion of the light. When the electrodes are driven, the electric field causes an alignment of the LC material, and this reduces or eliminated the dispersion of the light. Voltages of between 25 V to 125 V are commonly used depending on the thickness of the PDLC material. Because the power required is quite low, a photovoltaic array driven by a visible light source can provide the voltage and power required.

In polymer-stabilized LC cells, a polymer "web" is formed in the LC cell with a spatial variation in density. The LC material may have an ordered ground state using an alignment layer, and low voltages applied to planar transparent electrodes over the aperture can be used to change the LC material from a transparent ground state into a spatially varying excited state. Such a NLC cell acts on one polarization of light, and so two cells are used to modulate two orthogonal polarizations.

Other LC devices may require a layer of liquid crystal material to control light of a single polarization in a single direction, and thus these devices can comprise four layers of liquid crystal to control two polarizations in two directions.

The type of liquid crystal beam broadening device in FIG. 19A is better illustrated in FIGS. 20A, 20B and 20C. FIG. 20A shows the basic cell architecture that comprises substrates 12 having a gap filled with LC 20 that is typically oriented in the ground state by a rubbed alignment layer 18 for planar orientation, namely with the liquid crystal molecules aligned at a small pre-tilt angle with respect to the substrates. Electrodes 14A and 14B are patterned (interdigitated) parallel strip electrodes extending into the page. The effect of applying an electric field is to produce a spatial modulation of the liquid crystal molecular orientation that forms approximately a cylindrical lens as a result of the change in the index of refraction due to orientation. The optical modulation due to that approximately cylindrical lens acts essentially only on one polarization, and light is essentially broadened in the plane that is perpendicular to the electrode lines.

As illustrated in FIG. 20B, four such cells can be arranged to modulate light of two polarizations in two directions. The patterned electrode structure for one substrate in the device of FIG. 19 is schematically shown in FIG. 20C. FIG. 20D represents the light power distribution along the desired direction of broadening at various voltages. It also demonstrates a transformation of the original (at the ground state of the LC device) beam into a flat-top beam.

FIG. 21A is an image of two laser beams each passing through a LC beam broadening device similar to the one illustrated in FIGS. 20A to 20C wherein the LC devices are in the ground state. FIG. 21B shows the image of the two spot beams when the LC devices are powered and in the case that the LC devices are aligned, whereas FIG. 21C illustrates the case when the LC devices are not aligned. As can be seen, when the LC device provides a spatial structure to the modulated light, alignment is important to the appearance of the combination of controlled beams. Thus the rotational position adjustable mounting is important for such LC devices. As mentioned above, some LC devices, such as PDLC and Polymer-Stabilized LC devices, can be used to modulate light and do not provide a direction specific modulation, and so orientation does not matter.

FIG. 22 is a schematic illustration in side view of a belt or ring circuit board as shown in the sectional view in FIG. 19 that contains photovoltaic elements mounted on one side for collecting power from the light source. The same ring circuit can comprise also a drive ASIC, antenna, or other electronic circuit elements necessary for the dynamic control of the LC device. The LC cell as illustrated in FIG. 20A to 20C can be driven using a voltage of about 15V to 30V. PDLC devices are typically driven using voltages from 50V to 100V. A photovoltaic cell typically generates between 1V to 2V open circuit. Because most liquid crystal devices consume so little power (for example, tens of mW), small PV elements can be connected in series so as to generate low power at a high voltage suitable for driving such LC devices. By arranging the typically opaque PV devices and support (e.g. the circuit board) at the periphery of the beam control device, only a small portion of the beam is lost to the frame of the LC beam control device (for example, the above-mentioned ring may have 0.5 mm of width or so).

FIG. 23 is a schematic block diagram of the electronics of the LC beam control device according to one embodiment comprising many different options. For programming and/or controlling the beam control state of the LC device, three different types of communications interfaces are illustrated, namely an infrared (IR) interface, a Bluetooth interface and a WiFi interface. An IR interface is inexpensive and can include an IR emitter and receiver mounted on the output side of the frame of the device. A programming remote control device can be configured with input keys to signal to the controller a desired change in the beam control state of the LC device. A key can be used to signal that the selected state is to be a preset and thus stored in non-volatile memory. The key can specify directly the rank or order of the preset, or that can be specified with different input. The programming flow is illustrated in FIG. 24.

Alternatively, an RF wireless interface, for example Bluetooth or WiFi, can be used. Because such interfaces are commonly used with computers (including mobile computing and communication devices), the programming device can define the preset states with or without the controller implementing the selected preset to show the user the beam modulation, so that the selection can be confirmed by storing in non-volatile memory. Such RF wireless interfaces can also be used to control the beam modulation state directly without relying on presets stored in the LC beam control device's memory.

Although more complex in nature, the control of the LC beam modulation device can be done using different interfaces. One or more light sensors can be provided on the frame for detecting gestures near the frame that are interpreted into control or programming commands. A camera can be provided on the frame to capturing images of gesture that are likewise interpreted into control or programming commands. Such sensor elements may also be used to program "self-adjusting" functions of the LC beam control device. For example, the presence of people may be detected and a corresponding broadening angle may be obtained automatically according to pre-programming.

A Bluetooth transceiver module that is battery powered can be used as a remote control or as a wall mounted controller for controlling the state of the LC device, for example by causing a change from one preset to the next.

Another option is to control the beam control state of the LC device by toggling ON/OFF the light source using the conventional power switch of the light source. Using this option, the user can configure the LC beam control device to assume a chosen state when the light source is first turned on. This chosen state can correspond to a spot beam (unmodulated), a beam steering state and/or a beam broadening state. However, if only a static configuration were desired, static optics could be used. Advantageously, the LC beam control device can be configured to have other states, and a simple OFF/ON toggle of the light switch that causes the emitted light to switch OFF and back ON again, is detected by an ON/OFF detector circuit. The output of this detector circuit is provided to the controller. The controller can be a dedicated circuit, FPGA or processor executing program code in memory. The controller responds to the OFF/ON transition to cause the LC drive signal generator to change to drive signal parameters according to the next preset stored in non-volatile memory.

The circuit of FIG. 23 shows that the power from the PV elements charges a capacitor so that any intensity fluctuations are filtered. A portion of the PV elements can provide low voltage power to the circuitry and/or processor of the controller and other electronics, while the high voltage is used by power electronics in the LC drive signal generator to feed the drive signal to the LC electrodes. As shown, a low voltage regulator can also be used to convert the high voltage to supply the low voltage to the components.

FIG. 25 is an example of the sequence involved in the On/Off toggle control of the LC beam control device. When the light source is first turned on, power is supplied to the controller, and the controller retrieves the default preset from memory to cause the drive signal generator to control the LC device according to the default preset. In the case of a PDLC device with a no-modulation preset, a light that is turned on would always appear diffuse or broadened at first and then become a spot beam, since in a PDLC device, the ground state is diffuse and the fully powered state is transparent. In many other LC devices, the ground state is without modulation, and the spot beam would initially appear until any desired modulation were applied. As illustrated in FIG. 25, if the user toggles the light switch, then the detector circuit detects this rapid change of ON-OFF-ON, and signals the controller accordingly. The controller then controls the LC drive signal generator to implement the next preset state as stored in non-volatile memory. For example, there can be two states for a beam diffusion or broadening device, spot and flood. However, some LC devices can provide other modulations, and the states can be varied as a function of the LC device.

Alternatively, as illustrated schematically in FIG. 28, the control circuit can be integrated with the light source whose intensity modulation is used to control circuitry within the LC beam control device. Data communications in the light source can comprise a power line data interface, such as an X10 interface, a Bluetooth Interface or a WiFi interface, and the data communicated to the light source may be used to control the light source's continuous intensity. The data communicated can be interpreted by a controller that generates an intensity modulation signal for the drive circuit of the light source, so that a modulation in the light source intensity can be detected by the LC device's PV elements, decoded in a decoder and then used by a LC device controller to control the LC drive signal generator.

In the embodiment of FIG. 26, the light source is provided with communications ability that is used to be able to control the LC device. As will be appreciated this architecture lends itself also to LiFi embodiments. For example, a LiFi interface can comprise its own IR source and detector used to communicate using IR light with other LiFi devices. The LiFi interface can be connected to a wired or wireless data infrastructure using a non-LiFi connection, such as a power line data interface or a Bluetooth or WiFi network relay. The IR emitter and receiver of the LiFi interface can make use of the same optical path as the light source, for example, the same reflector or focussing optics. Furthermore, the IR emitter and receiver of the LiFi interface can use the LC device to shape the area with which the LiFi interface will communicate. The LC device can be used to tailor such an area as desired. The LiFi interface can be used, in turn, to communicate control commands with the LC Device Controller to improve LiFi performance.

FIG. 27 illustrates a variant embodiment of FIG. 26 in which power for the LC beam control device is provided by an electrical connector from the light source. In this embodiment, power line voltage can be delivered to the LC beam control device and if required a voltage.

While the invention has been shown and described with reference to preferred embodiments thereof, it will be recognized by those skilled in the art that various changes in form and detail may be made therein without departing from the spirit and scope of the invention as defined by the appended claims.

What is claimed is:

1. A liquid crystal beam control device comprising:
   a liquid crystal spatial light modulator having control electrodes;
   a photovoltaic array arranged to receive light from a light source;
   a drive signal circuit connected to said photovoltaic array and outputting a drive signal to said control electrodes in response to an input control signal;
   a controller responsive to a command signal and outputting said input control signal; and
   a mounting frame comprising a central aperture, said mounting frame being configured to secure said liquid crystal spatial light modulator to said light source, wherein said liquid crystal spatial light modulator comprises a substrate connected to said mounting frame and supporting said photovoltaic array on a periphery of said central aperture, said photovoltaic array being arranged to intercept an outer portion of a beam of said light source.

2. The device as defined in claim 1, wherein said mounting frame is removably connected to said light source.

3. The device as defined in claim 1, wherein the liquid crystal spatial light modulator and mounting frame are circular.

4. The device as defined in claim 3, wherein the photovoltaic array is arranged on a circuit board ring.

5. The device as defined in claim 1, wherein the photovoltaic array is arranged on a light source side of the liquid crystal spatial light modulator.

6. The device as defined in claim 1, further comprising a light source intensity modulation detector configured to provide said command signal based on a modulation of the light source.

7. The device as defined in claim 6, wherein the light source intensity modulation detector responds to an OFF/ON toggling of the light source.

8. The device as defined in claim 6, wherein the light source intensity modulation detector demodulates an intensity modulation of the light source.

9. The device as defined in claim 1, further comprising a wireless data interface connected to said controller for providing said command signal.

10. The device as defined in claim 1, wherein said mounting frame is rotatable for allowing a rotational alignment of said liquid crystal spatial light modulator.

11. A lighting device comprising:
    the liquid crystal beam control device as defined in claim 1,
    wherein the light source is a spot light source and the beam of said light source is a spot light beam.

12. A liquid crystal beam control device comprising:
    a liquid crystal spatial light modulator having control electrodes;
    a photovoltaic array arranged to receive light from a light source;

a drive signal circuit connected to said photovoltaic array and outputting a drive signal to said control electrodes in response to an input control signal;

a light source intensity modulation detector configured to provide a command signal based on a modulation of the light source;

a controller responsive to a command signal and outputting said input control signal; and a mounting frame comprising a central aperture, said mounting frame being configured to secure said liquid crystal spatial light modulator to said light source, wherein said liquid crystal spatial light modulator comprises a substrate connected to said mounting frame and supporting said photovoltaic array on a periphery of said central aperture, said photovoltaic array being arranged to intercept an outer portion of a beam of said light source.

13. The device as defined in claim 12, wherein the light source intensity modulation detector responds to an OFF/ON toggling of the light source.

14. The device as defined in claim 12, wherein the light source intensity modulation detector demodulates an intensity modulation of the light source.

15. The device as defined in claim 12, wherein said mounting frame further comprises an electrical connector for receiving electrical power from said light source.

16. The device as defined in claim 12,
wherein said mounting frame is rotatable for allowing a rotational alignment of said liquid crystal spatial light modulator.

17. The device as defined in claim 12, wherein the liquid crystal spatial light modulator and mounting frame are circular.

18. The device as defined in claim 12, wherein said mounting frame is removably connected to said light source.

19. A lighting device comprising:
the liquid crystal beam control device as defined in claim 12,
wherein the light source is a spot light source and the beam of said light source is a spot light beam.

* * * * *